(12) United States Patent
Nam et al.

(10) Patent No.: US 12,199,773 B2
(45) Date of Patent: Jan. 14, 2025

(54) HYBRID AUTOMATIC REPEAT REQUEST (HARQ) FEEDBACK FOR ACTIVE HARQ PROCESSES

(71) Applicant: QUALCOMM Incorporated, San Diego, CA (US)

(72) Inventors: Wooseok Nam, San Diego, CA (US); Jing Sun, San Diego, CA (US); Tao Luo, San Diego, CA (US); Xiaoxia Zhang, San Diego, CA (US); Arumugam Chendamarai Kannan, San Diego, CA (US); Juan Montojo, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/656,795

(22) Filed: Mar. 28, 2022

(65) Prior Publication Data

US 2022/0311550 A1     Sep. 29, 2022

Related U.S. Application Data

(60) Provisional application No. 63/167,522, filed on Mar. 29, 2021.

(51) Int. Cl.
*H04L 1/1812*   (2023.01)
*H04L 1/1607*   (2023.01)
*H04L 1/1822*   (2023.01)
*H04L 5/00*     (2006.01)

(52) U.S. Cl.
CPC .......... *H04L 1/1812* (2013.01); *H04L 1/1671* (2013.01); *H04L 1/1822* (2013.01); *H04L 5/0064* (2013.01)

(58) Field of Classification Search
CPC .............. H04W 72/1273; H04W 72/23; H04L 5/0055; H04L 1/1812; H04L 1/1858;
(Continued)

(56) References Cited

U.S. PATENT DOCUMENTS

2016/0261379 A1* 9/2016 Bergström ............ H04W 72/23
2019/0082450 A1* 3/2019 Ying .................... H04L 1/1812
(Continued)

OTHER PUBLICATIONS

WO_2021027443_A1 (Year: 2021).*
(Continued)

*Primary Examiner* — Rushil P. Sampat
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network entity, an indication associated with a quantity of active hybrid automatic repeat request (HARQ) processes, wherein the quantity of active HARQ processes is dynamically changeable based at least in part on an operating band and an associated subcarrier spacing. The UE may transmit, to the network entity, HARQ feedback based at least in part on the indication associated with the quantity of active HARQ processes. Numerous other aspects are described.

30 Claims, 12 Drawing Sheets

(58) Field of Classification Search
CPC ... H04L 1/1861; H04L 5/0044; H04L 5/0053; H04L 5/0094; H04L 5/001; H04L 1/1671; H04L 1/1822; H04L 5/0064
See application file for complete search history.

(56) References Cited

U.S. PATENT DOCUMENTS

| | | | | |
|---|---|---|---|---|
| 2019/0141647 | A1* | 5/2019 | Nimbalker | H04L 5/0048 |
| 2021/0050956 | A1* | 2/2021 | Yeo | H04L 41/0803 |
| 2021/0167900 | A1* | 6/2021 | Karaki | H04L 5/0055 |
| 2022/0104232 | A1* | 3/2022 | Nimbalker | H04L 27/26025 |
| 2022/0330287 | A1* | 10/2022 | Si | H04L 1/1861 |
| 2023/0224898 | A1* | 7/2023 | Ling | H04L 1/1861 370/329 |
| 2023/0421310 | A1* | 12/2023 | Ying | H04W 72/51 |

OTHER PUBLICATIONS

WO_2021248452_A1 (Year: 2021).*
ERICSSON., et al., "Per-HARQ Process Activation for 2ms TTI", 3GPP TSG-RAN WG2 #74, R2-113324_CELLFACH_PERHARQ_PROCESS_V10, 3GPP, Mobile Competence Centre, 650, Route Des Lucioles, F-06921, Sophia-Antipolis Cedex, France, vol. RAN WG2, No. Barcelona, Spain, May 9-13, 2011, May 3, 2011, XP050495438, pp. 1-2.
HUAWEI., et al., "Discussion on UL-DL configuration for NR UR RRFSENS", 3GPP TSG-RAN WG4 Meeting #AH-1807, R4-1809295 Disc On TDD UL DL Config for NR UE REFSENS, 3GPP, Mobile Competence Centre, 650, Route Des Lucioles, F-06921, Sophia-Antipolis Cedex, France, vol. RAN WG4, No. Montreal, Canada, Jul. 2, 2018-Jul. 6, 2018, Jun. 25, 2018, XP051583511, 4 Pages, URL: http://www.3gpp.org/ftp/tsg%5Fran/WG4%5FRadio/TSGR4%5FAHs/TSGR4%5FAH%2D1807/Docs/R4%2D1809295%2Ezip.
Partial International Search Report—PCT/US2022/071408—ISA/EPO—Jul. 14, 2022.
International Search Report and Written Opinion—PCT/US2022/071408—ISA/EPO—Nov. 2, 2022.
NTT DOCOMO., et al., "Views on Soft-Buffer Management for NR", 3GPP TSG RAN WG1 Meeting 90bis, R1-1718220, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 3, 2017, pp. 1-4, XP051352928, section 1, section 2, par. 2 p. 2, par. 3 section 2, par. 3 section 3, box 1.

* cited by examiner

HYBRID AUTOMATIC REPEAT REQUEST (HARQ) FEEDBACK FOR ACTIVE HARQ PROCESSES

CROSS-REFERENCE TO RELATED APPLICATION

This Patent Application claims priority to U.S. Provisional Patent Application No. 63/167,522, filed on Mar. 29, 2021, entitled "HYBRID AUTOMATIC REPEAT REQUEST (HARQ) FEEDBACK FOR ACTIVE HARQ PROCESSES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for hybrid automatic repeat request (HARQ) feedback for active HARQ processes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive, from a network entity, an indication associated with a quantity of active hybrid automatic repeat request (HARQ) processes, wherein the quantity of active HARQ processes is dynamically changeable based at least in part on an operating band and an associated subcarrier spacing; and transmit, to the network entity, HARQ feedback based at least in part on the indication associated with the quantity of active HARQ processes.

In some aspects, a network entity for wireless communication includes a memory and one or more processors, coupled to the memory, configured to: transmit, to a UE, an indication associated with a quantity of active HARQ processes, wherein the quantity of active HARQ processes is dynamically changeable based at least in part on an operating band and an associated subcarrier spacing; and receive, from the UE, HARQ feedback based at least in part on the indication associated with the quantity of active HARQ processes.

In some aspects, a UE for wireless communication includes a memory and one or more processors, coupled to the memory, configured to: receive, from a network entity, an indication associated with limited buffer rate matching (LBRM) per active HARQ process, wherein the indication associated with the LBRM indicates different maximum buffer sizes per active HARQ process; and perform a rate matching for incremental redundancy HARQ based at least in part on the indication.

In some aspects, a network entity for wireless communication includes a memory and one or more processors, coupled to the memory, configured to: transmit, to a UE, an indication associated with LBRM per active HARQ process, wherein the indication associated with the LBRM indicates different maximum buffer sizes per active HARQ process; and perform a rate matching based at least in part on the indication associated with the LBRM per active HARQ process.

In some aspects, a method of wireless communication performed by a UE includes receiving, from a network entity, an indication associated with a quantity of active HARQ processes, wherein the quantity of active HARQ processes is dynamically changeable based at least in part on an operating band and an associated subcarrier spacing; and transmitting, to the network entity, HARQ feedback based at least in part on the indication associated with the quantity of active HARQ processes.

In some aspects, a method of wireless communication performed by a network entity includes transmitting, to a UE, an indication associated with a quantity of active HARQ processes, wherein the quantity of active HARQ processes is dynamically changeable based at least in part on an operating band and an associated subcarrier spacing; and receiving, from the UE, HARQ feedback based at least in part on the indication associated with the quantity of active HARQ processes.

In some aspects, a method of wireless communication performed by a UE includes receiving, from a network entity, an indication associated with LBRM per active HARQ process, wherein the indication associated with the LBRM indicates different maximum buffer sizes per active HARQ process; and performing a rate matching for incremental redundancy HARQ based at least in part on the indication.

In some aspects, a method of wireless communication performed by a network entity includes transmitting, to a UE, an indication associated with LBRM per active HARQ process, wherein the indication associated with the LBRM indicates different maximum buffer sizes per active HARQ process; and performing a rate matching based at least in part on the indication associated with the LBRM per active HARQ process.

In some aspects, a non-transitory computer-readable medium storing a set of instructions for wireless communication includes one or more instructions that, when executed by one or more processors of a UE, cause the UE to: receive, from a network entity, an indication associated with a quantity of active HARQ processes, wherein the quantity of active HARQ processes is dynamically changeable based at least in part on an operating band and an associated subcarrier spacing; and transmit, to the network entity, HARQ feedback based at least in part on the indication associated with the quantity of active HARQ processes.

In some aspects, a non-transitory computer-readable medium storing a set of instructions for wireless communication includes one or more instructions that, when executed by one or more processors of a network entity, cause the network entity to: transmit, to a UE, an indication associated with a quantity of active HARQ processes, wherein the quantity of active HARQ processes is dynamically changeable based at least in part on an operating band and an associated subcarrier spacing; and receive, from the UE, HARQ feedback based at least in part on the indication associated with the quantity of active HARQ processes.

In some aspects, a non-transitory computer-readable medium storing a set of instructions for wireless communication includes one or more instructions that, when executed by one or more processors of a UE, cause the UE to: receive, from a network entity, an indication associated with LBRM per active HARQ process, wherein the indication associated with the LBRM indicates different maximum buffer sizes per active HARQ process; and perform a rate matching for incremental redundancy HARQ based at least in part on the indication.

In some aspects, a non-transitory computer-readable medium storing a set of instructions for wireless communication includes one or more instructions that, when executed by one or more processors of a network entity, cause the network entity to: transmit, to a UE, an indication associated with LBRM per active HARQ process, wherein the indication associated with the LBRM indicates different maximum buffer sizes per active HARQ process; and perform a rate matching based at least in part on the indication associated with the LBRM per active HARQ process.

In some aspects, an apparatus for wireless communication includes means for receiving, from a network entity, an indication associated with a quantity of active HARQ processes, wherein the quantity of active HARQ processes is dynamically changeable based at least in part on an operating band and an associated subcarrier spacing; and means for transmitting, to the network entity, HARQ feedback based at least in part on the indication associated with the quantity of active HARQ processes.

In some aspects, an apparatus for wireless communication includes means for transmitting, to a UE, an indication associated with a quantity of active HARQ processes, wherein the quantity of active HARQ processes is dynamically changeable based at least in part on an operating band and an associated subcarrier spacing; and means for receiving, from the UE, HARQ feedback based at least in part on the indication associated with the quantity of active HARQ processes.

In some aspects, an apparatus for wireless communication includes means for receiving, from a network entity, an indication associated with LBRM per active HARQ process, wherein the indication associated with the LBRM indicates different maximum buffer sizes per active HARQ process; and means for performing a rate matching for incremental redundancy HARQ based at least in part on the indication.

In some aspects, an apparatus for wireless communication includes means for transmitting, to a UE, an indication associated with LBRM per active HARQ process, wherein the indication associated with the LBRM indicates different maximum buffer sizes per active HARQ process; and means for performing a rate matching based at least in part on the indication associated with the LBRM per active HARQ process.

Aspects generally include a method, apparatus, system, computer program product, non-transitory computer-readable medium, user equipment, network entity, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
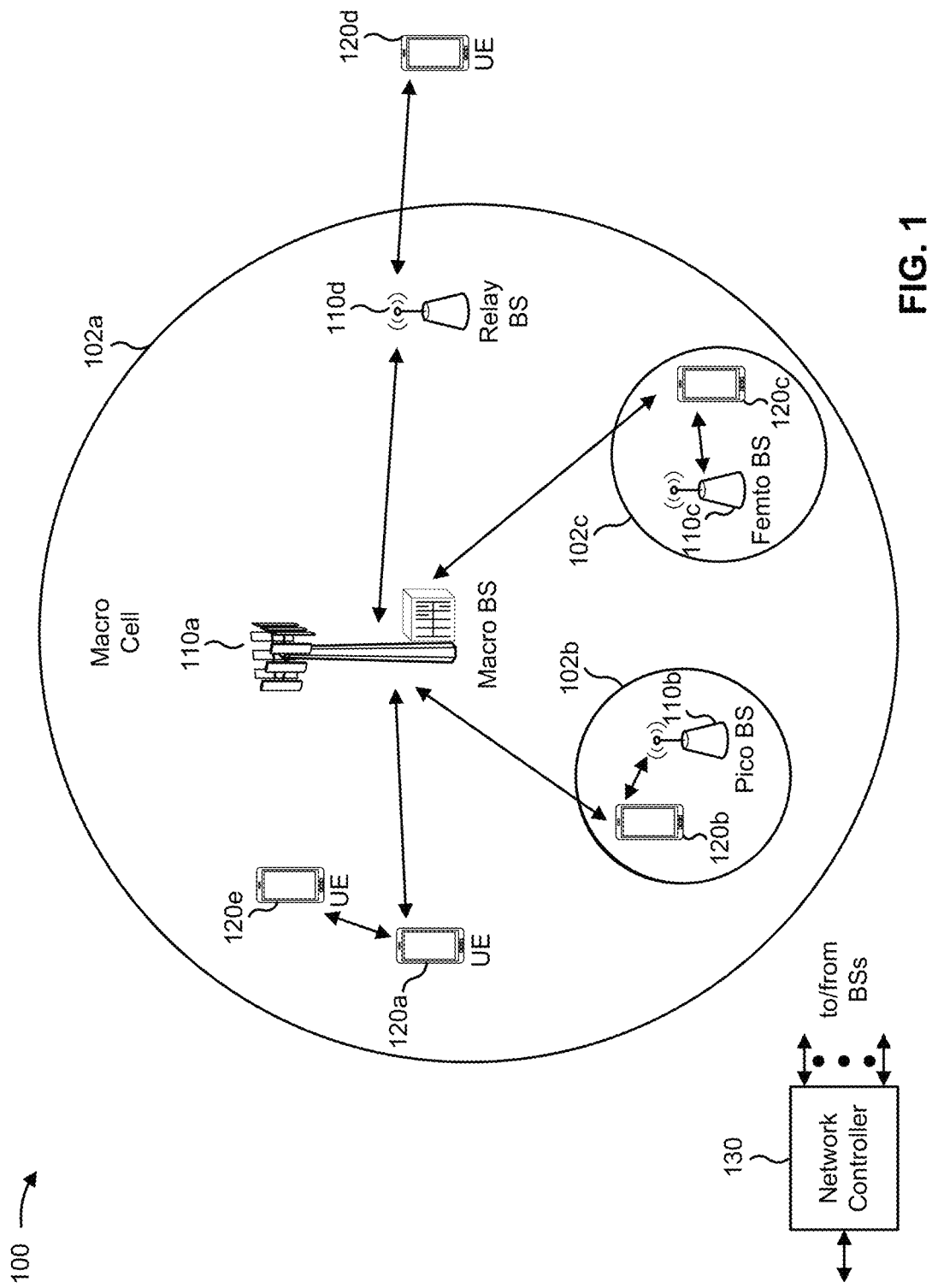
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
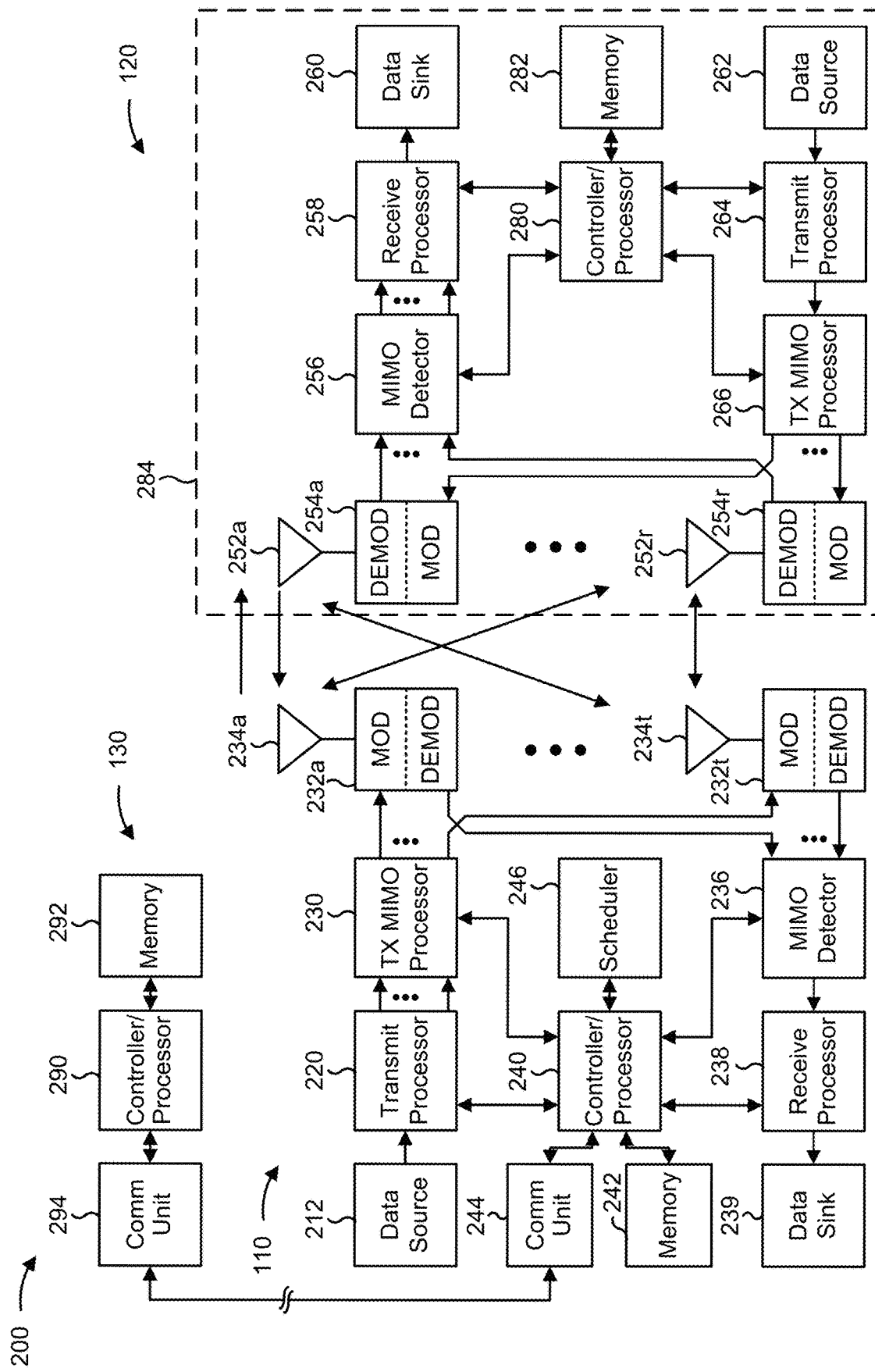
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-9).

The controller/processor 240 of the base station 110, the controller/processor 280 of the UE 120, and/or any other component(s) of FIG. 2 may perform one or more techniques associated with hybrid automatic repeat request (HARQ) feedback for active HARQ processes, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network entity, an indication associated with a quantity of active HARQ processes, wherein the quantity of active HARQ processes is dynamically changeable based at least in part on an operating band and an associated subcarrier spacing; and/or means for transmitting, to the network entity, HARQ feedback based at least in part on the indication associated with the quantity of active HARQ processes. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a network entity (e.g., base station 110) includes means for transmitting, to a UE, an indication associated with a quantity of active HARQ processes, wherein the quantity of active HARQ processes is dynamically changeable based at least in part on an operating band and an associated subcarrier spacing; and/or means for receiving, from the UE, HARQ feedback based at least in part on the indication associated with the quantity of active HARQ processes. The means for the network entity to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, a UE (e.g., UE 120) includes means for receiving, from a network entity, an indication associated with limited buffer rate matching (LBRM) per active HARQ process, wherein the indication associated with the LBRM indicates different maximum buffer sizes per active HARQ process; and/or means for performing a rate matching for incremental redundancy HARQ based at least in part on the indication. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a base station (e.g., base station 110) includes means for transmitting, to a UE, an indication associated with LBRM per active HARQ process, wherein the indication associated with the LBRM indicates different maximum buffer sizes per active HARQ process; and/or means for performing a rate matching based at least in part on the indication associated with the LBRM per active HARQ process. The means for the network entity to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

For HARQ processes in NR, a media access control (MAC) entity may include a HARQ entity for each serving cell, which may maintain a quantity of parallel HARQ processes. Each HARQ process may be associated with a HARQ process identifier. Up to 16 parallel downlink HARQ processes may be available per serving cell, and up to 16 parallel uplink HARQ processes may be available per serving cell. In other words, up to a total of 32 parallel HARQ processes may be available per serving cell for both downlink and uplink. For downlink, a number of HARQ processes for a physical downlink shared channel (PDSCH) (nrofHARQ-ProcessesForPDSCH) higher layer parameter may indicate a quantity of HARQ processes for each serving cell. For uplink, a quantity of HARQ processes may not be indicated by a higher layer parameter, but rather may be hard-coded as 16. For ultra-reliable low-latency communication (URLLC) operation, a HARQ process number size for downlink control information (DCI) format 0_2 (HARQProcessNumberSize-ForDCIFormatO 2) higher layer parameter and a HARQ process number size for DCI format 1_2 (HARQProcessNumberSize-ForDCIFormatl 2) higher layer parameter may indicate a quantity of HARQ processes for uplink and downlink, respectively. The up to 16 parallel HARQ processes in uplink and in downlink may be semi-statically configured via the higher layer parameters.

A quantity of HARQ processes needed may be based at least in part on a turn-around time of data scheduling. For example, the data scheduling may be associated with FR1 and FR2 in an NR system. A turn-around time may be from a time of an initial transmission to a time of a potential retransmission after receiving HARQ acknowledgement (HARQ-ACK) feedback. A longer turn-around time may correspond to a larger quantity of needed HARQ processes, whereas a shorter turn-around time may correspond to a fewer quantity of needed HARQ processes.

NR may support LBRM and incremental redundancy HARQ, which may involve a receiver combining (e.g., soft combining) different redundancy versions (RVs) of the same data over multiple transmissions (e.g., initial transmissions and/or retransmissions). A circular buffer per code block per HARQ process may be used for the combining of the different RVs of the same data over the multiple transmissions. Further, when LBRM is enabled, which may be a default setting for downlink, a maximum buffer length associated with the circular buffer may be limited by $N_{cb}=\min\{N, N_{ref}\}$, where $N_{ref}$ indicates a maximum buffer size of the circular buffer given by $$N_{ref} = \left\lfloor \frac{TBS_{LBRM}}{C \cdot R_{LBRM}} \right\rfloor,$$

where $T\_S_{LBRM}$ indicates a reference transport block size for LBRM and $R_{LBRM}=2/3$ indicates a reference code rate for LBRM. The LBRM may be a per-cell feature, such that when LBRM is configured in a cell, a plurality of HARQ processes associated with the cell may have a same maximum buffer size limit.

Rate matching may serve to extract a suitable quantity of coded bits to match resources assigned for a transmission. Rate matching may be performed separately for each code block. A fixed number of systematic bits may be punctured, depending on a code block size. Remaining coded bits may be written into a circular buffer, starting with non-punctured systematic bits and continuing with parity bits. A selection of bits to transmit may be based at least in part on reading a quantity of bits from the circular buffer, where a set of bits to transmit may depend on an RV corresponding to different starting positions in the circular buffer. By selecting different redundancy versions, different sets of coded bits representing the same set of information bits may be generated, which may be used when implementing incremental redundancy HARQ.

Figure 3:
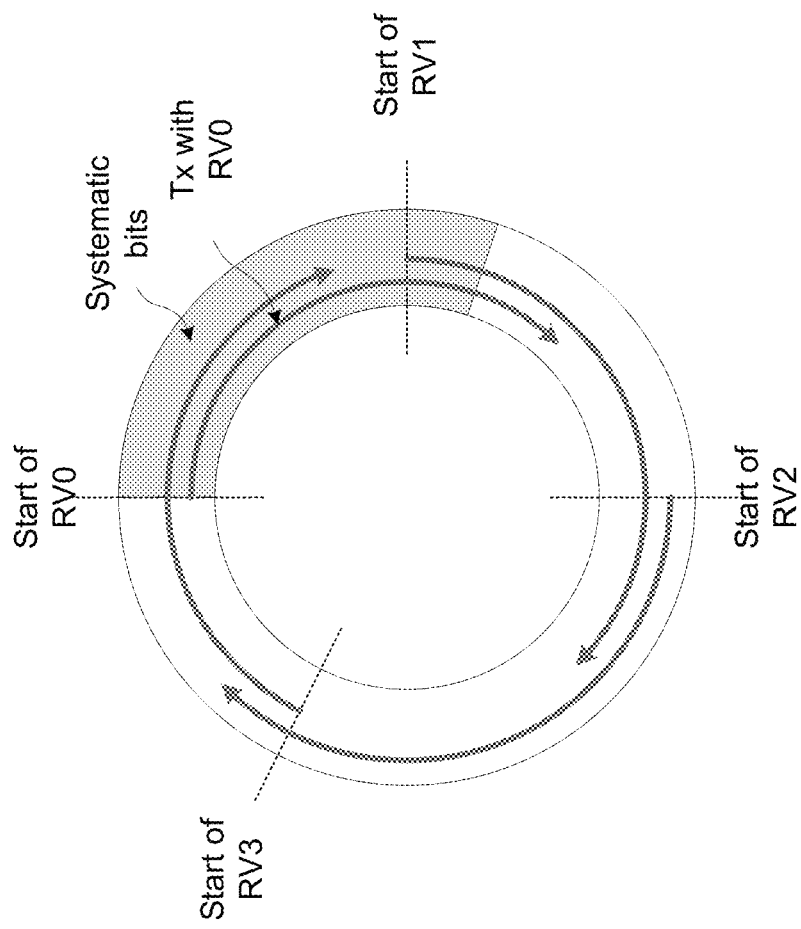
FIG. 3 is a diagram illustrating an example of a circular buffer, in accordance with the present disclosure.

FIG. 3 is a diagram illustrating an example 300 of a circular buffer, in accordance with the present disclosure.

As shown in FIG. 3, the circular buffer may indicate different starting positions corresponding to different RVs, such as RV0, RV1, RV2, and RV3. A set of bits to transmit may be based at least in part on the different RVs corresponding to different starting positions of the circular buffer. In other words, each RV may be associated with a different set of bits representing a same set of information bits. Further, starting points in the circular buffer may be defined such that both RV0 and RV3 are self-decodable (e.g., include systematic bits).

A receiver may buffer coded bits received from a transmitter. When a retransmission of data involving retransmitted coded bits occurs, the receiver may perform decoding using the buffered coded bits combined with the retransmitted coded bits. In other words, the receiver may combine different redundancy versions of the same data over initial transmissions and retransmissions.

As indicated above, FIG. 3 is provided as an example. Other examples may differ from what is described with regard to FIG. 3.

A quantity of HARQ processes may be semi-statically configured for uplink and downlink, and the quantity of HARQ processes may be limited to 16 HARQ processes. For higher bands with larger subcarrier spacing and shorter symbol durations, processing and decoding timelines may not directly scale with the larger subcarrier spacing, so the quantity of HARQ processes may need to be increased to be greater than 16 HARQ processes. The processing and decoding timelines may be for a physical downlink shared channel (PDSCH), a physical downlink control channel (PDCCH), a physical uplink shared channel (PUSCH), and/or a physical uplink control channel (PUCCH). However, in some cases, the quantity of HARQ processes may change, so configuring the quantity of HARQ processes via the semi-static configuration may be unsuitable.

In various aspects of techniques and apparatuses described herein, a UE may receive, from a network entity (e.g., a base station), an indication associated with a quantity of active HARQ processes. The quantity of active HARQ processes may be dynamically changeable based at least in part on an operating band and an associated subcarrier spacing. In some aspects, the indication may indicate a subset of HARQ processes to be active from a set of semi-statically configured HARQ processes. In some aspects, the indication may be a dynamic parameter that indicates the quantity of active HARQ processes. The UE may transmit, to the network entity, HARQ feedback based at least in part on the indication associated with the quantity of active HARQ processes. As a result, for scenarios in which a processing and decoding timeline is changed based at least in part on a bandwidth and/or an associated subcarrier spacing, the quantity of active HARQ processes may be dynamically configured based at least in part on the processing and decoding timeline.

In various aspects of techniques and apparatuses described herein, a UE may receive, from a network entity, an indication associated with LBRM per active HARQ process. The indication associated with the LBRM may indicate different maximum buffer sizes per active HARQ process. In some aspects, a total buffer size may be equally divided by a quantity of active HARQ processes and assigned to each of the quantity of active HARQ processes. In some aspects, the indication may indicate a maximum buffer size that is specific to a single active HARQ process. The network entity may perform rate matching based at least in part on the indication associated with LBRM per active HARQ process. The UE may perform rate matching for incremental redundancy HARQ based at least in part on the indication associated with the LBRM per active HARQ process. The rate matching may include HARQ combining for incremental redundancy HARQ. As a result, different active HARQ processes, which may be based at least in part on corresponding processing and decoding timelines, may be associated with different maximum buffer sizes. In other words, a maximum buffer size may be defined per HARQ process, and different active HARQ processes may be associated with different maximum buffer sizes.

Figure 4:
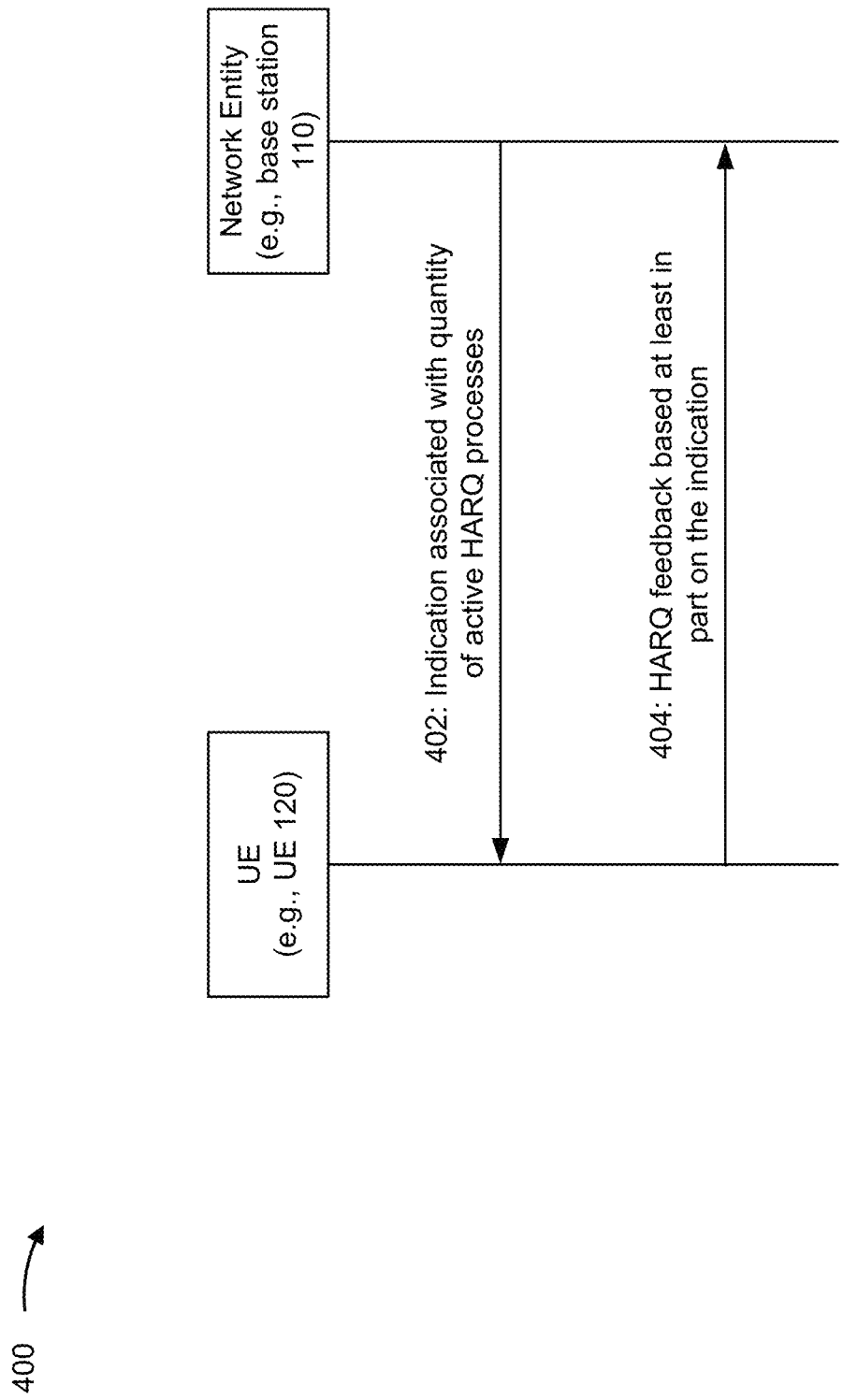
FIGS. 4-5 are diagrams illustrating examples associated with hybrid automatic repeat request (HARQ) feedback for active HARQ processes, in accordance with the present disclosure.

FIG. 4 is a diagram illustrating an example 400 associated with HARQ feedback for active HARQ processes, in accordance with the present disclosure. As shown in FIG. 4, example 400 includes communication between a UE (e.g., UE 120) and a network entity (e.g., base station 110). In some aspects, the UE and the network entity may be included in a wireless network such as wireless network 100.

As shown by reference number 402, the UE may receive, from the network entity, an indication associated with a quantity (e.g., M) of active HARQ processes. The quantity of active HARQ processes may be dynamically changeable based at least in part on an operating band and an associated subcarrier spacing. The quantity of active HARQ processes may be dynamically changed for higher-band applications, such as applications operating in a 60 GHz band. In some aspects, the indication may indicate a subset of HARQ processes to be active from a set of semi-statically configured HARQ processes. For example, a subset of HARQ processes may be selected to be active in a subset of semi-statically configured HARQ processes. In some aspects, the indication may be a dynamic parameter that indicates the quantity of active HARQ processes. In other words, rather than a semi-static configuration, a dynamic parameter for a total quantity of active HARQ processes may be used.

In some aspects, the indication may be a second indication, and the UE may previously transmit a first indication of a preferred quantity of active HARQ processes to the network entity. The UE may receive, from the network entity, a second indication associated with the quantity of active HARQ processes based at least in part on the first indication. The UE may transmit the first indication of the preferred quantity of active HARQ processes via uplink control information (UCI), a media access control control element (MAC-CE), or UE assistance information (UAI) feedback. The network entity may transmit the second indication associated with the quantity of active HARQ processes based at least in part on the preferred quantity of active HARQ processes indicated by the UE. The network entity may transmit the second indication associated with the quantity of active HARQ processes via downlink control information (DCI), a MAC-CE, or radio resource control (RRC) signaling.

In some aspects, an adaptation of total active HARQ processes may be initiated by the network entity or the UE. For example, the UE may indicate a preferred value (e.g., M) of active HARQ processes via UCI, a MAC-CE or UAI feedback. Additionally, or alternatively, the network entity may indicate the active (e.g., M) HARQ processes via DCI, a MAC-CE, or RRC signaling.

In some aspects, the quantity of active HARQ processes may be associated with dynamic scheduling or semi-persistent scheduling (SPS). In other words, the adaptation of the total active HARQ processes may be applied for dynamic scheduling and/or configured scheduling, such as SPS.

In some aspects, the quantity of active HARQ processes may be associated with consecutive HARQ process identifiers or non-consecutive HARQ process identifiers based at least in part on a bitmap. For example, a selection of active HARQ processes may be consecutive (e.g., from HARQ ID 0 to M−1), or the selection of active HARQ processes may be non-consecutive (e.g., by a bitmap).

In some aspects, a HARQ process number field in a scheduling DCI may be based at least in part on a size of the quantity of active HARQ processes. For example, the HARQ process number field in the scheduling DCI may be based at least in part on the size of an active set of HARQ processes (e.g., $\lceil \log_2 M \rceil$ bits). The HARQ process number field may be applicable to certain DCI formats, such as DCI format 1_2/0_2.

In some aspects, a HARQ process number field in a scheduling DCI may be mapped to active HARQ process identifiers when the quantity of active HARQ processes are associated with non-consecutive HARQ process identifiers. The HARQ process number field in the scheduling DCI may be sequentially mapped or non-sequentially mapped to the active HARQ process identifiers. A mapping between the HARQ process number field and the active HARQ process identifiers may be a unique one-to-one mapping. In other words, when active HARQ process identifiers are not consecutive, the HARQ process number field (or codepoint) in the scheduling DCI may be mapped to the active HARQ process identifiers.

In some aspects, the UE may receive, from the network entity, a first indication associated with a quantity of activated HARQ processes. The UE may receive, from the network entity, a second indication associated with a quantity of deactivated HARQ processes. Further, the quantity of activated HARQ processes may be associated with a downlink or an uplink, and the quantity of deactivated HARQ processes may be associated with a downlink or an uplink. In other words, a dynamic activation and deactivation of HARQ processes may be separately applied for downlink and uplink.

As shown by reference number 404, the UE may transmit, to the network entity, HARQ feedback based at least in part on the indication associated with the quantity of active HARQ processes. The HARQ feedback may be based at least in part on a downlink transmission received from the network entity. The quantity of active HARQ processes, as indicated in the indication received from the network entity, may enable the UE to transmit the HARQ feedback associated with the downlink transmission to the network entity.

As indicated above, FIG. 4 is provided as an example. Other examples may differ from what is described with regard to FIG. 4.

Figure 5:
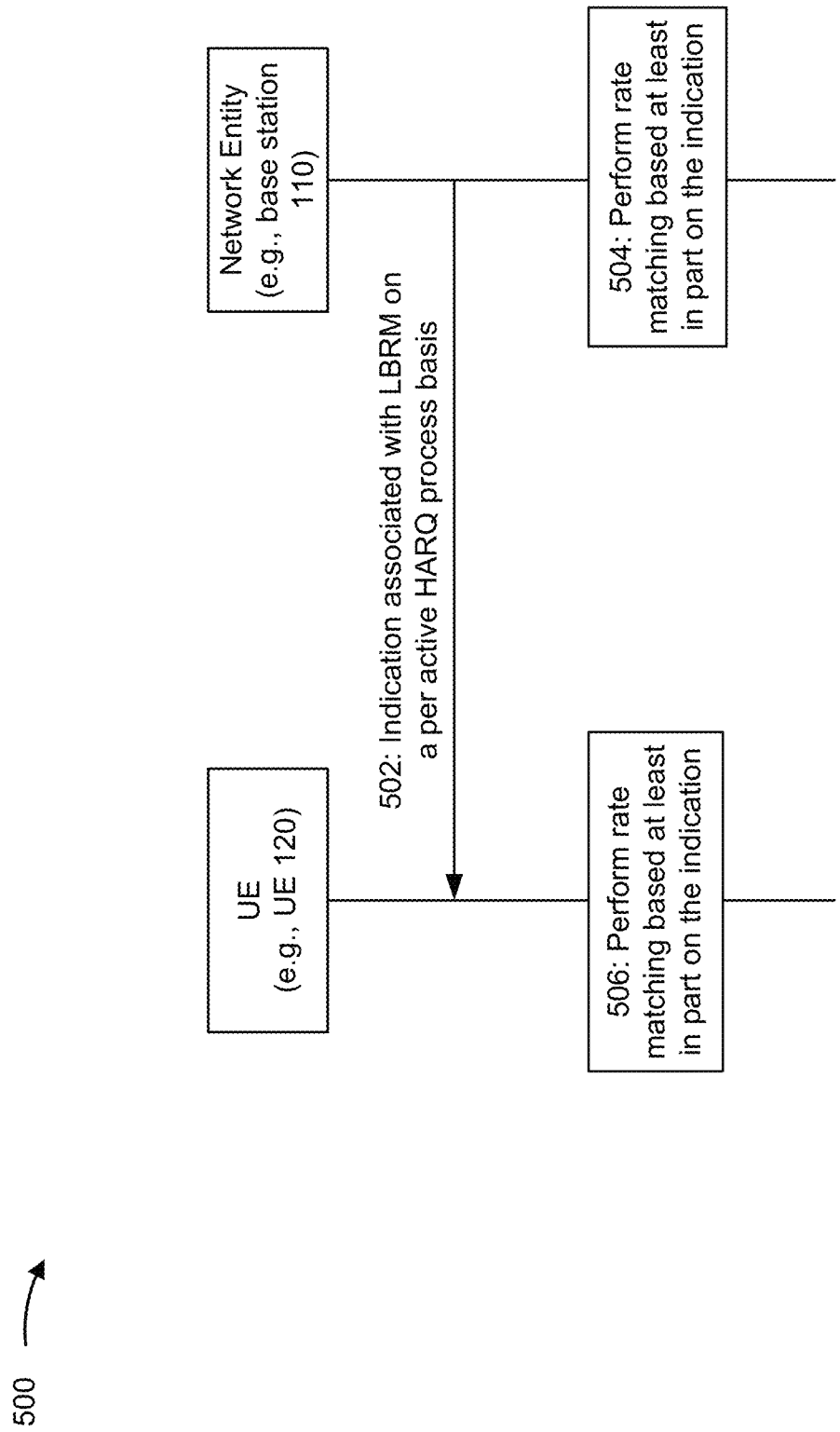

FIG. 5 is a diagram illustrating an example 500 associated with HARQ feedback for active HARQ processes, in accordance with the present disclosure. As shown in FIG. 5, example 500 includes communication between a UE (e.g., UE 120) and a network entity (e.g., base station 110). In some aspects, the UE and the network entity may be included in a wireless network such as wireless network 100.

As shown by reference number 502, the UE may receive, from the network entity, an indication associated with LBRM per active HARQ process. The indication associated with the LBRM may indicate different maximum buffer sizes per active HARQ process. The indication may indicate a HARQ buffer size for each active HARQ process. The LBRM may be associated with a per-active HARQ process configuration, as opposed to LBRM that is associated with a per-cell configuration.

In some aspects, a total buffer size may be equally divided by a quantity (e.g., M) of active HARQ processes and assigned to each of the quantity of active HARQ processes. For example, for each active HARQ process, a circular buffer size may be given by $N_{cb}=\min\{N, N_{max}\}$, where N is an encoded block size, and $$N_{max} = \left\lfloor \frac{N_{total}}{C \cdot M} \right\rfloor,$$

where $N_{total}$ is a total buffer size given by a UE capability, M is the quantity of active HARQ processes, and C indicates a quantity of code blocks.

In some aspects, the indication may indicate a maximum buffer size that is specific to a single active HARQ process. A HARQ buffer size may be individually indicated for each active HARQ process. In some aspects, the UE may receive the indication via a semi-static assignment. The semi-static assignment may be received via RRC signaling and/or a MAC-CE. In some aspects, the indication may be a second indication, and the UE may previously transmit, to the network entity, a first indication of a preferred buffer size via UCI, a MAC-CE, or UAI feedback. The UE may receive the second indication of the LBRM on the per active HARQ process basis based at least in part on the first indication.

In some aspects, the UE may recommend the preferred buffer size for each active HARQ process via UCI, a MAC-CE, or UAI feedback. The UE may indicate, based at least in part on the preferred buffer size, a maximum buffer size $N_{max,i}$ of each active HARQ process index i. The indication may be along with or separate from an adaptation command for a quantity of active HARQ processes (e.g., M).

In some aspects, the UE may receive, from the network entity, a first indication of the quantity of active HARQ processes (e.g., M). Further, the UE may receive, from the network entity, a second indication of a maximum buffer size for each of the quantity of active HARQ processes. The second indication may be part of the indication associated with the LBRM on the per active HARQ process basis, which may associate different maximum buffer sizes per active HARQ process.

In some aspects, the UE may receive the indication via a dynamic assignment. A scheduling DCI may include a field indicating a maximum buffer size for scheduled data (e.g., $N_{max,i}$), and a listing of candidate maximum buffer sizes may be configured and an index of the listing may be indicated in the scheduling DCI. In other words, the listing of candidate maximum buffer sizes may be preconfigured/predetermined, and the index of the listing may be indicated by the scheduling DCI.

In some aspects, an aggregation of maximum buffer sizes for a plurality of active HARQ processes may not exceed a UE capability. In other words, the UE may not expect that a sum of maximum buffer sizes (e.g., $\Sigma_i C_i \cdot N_{max,i}$), as dynamically indicated for the plurality of active HARQ processes, does not exceed a UE maximum buffer size capability (e.g., $N_{total}$), in accordance with $\Sigma_i C_i \cdot N_{max,i} \leq N_{total}$.

In some aspects, the indication may indicate a zero buffer size for a specific active HARQ process, and no HARQ combining may be permitted for a HARQ identifier associated with the specific active HARQ process. For example, if the zero buffer size is assigned either semi-statically or dynamically for an active HARQ process, no HARQ combining may be allowed for a HARQ ID associated with the active HARQ process. In this case, the network entity may use RV0 or RV3 (which may be self-decodable) for that HARQ ID.

In some aspects, a circular buffer size at the UE for HARQ combining may correspond to a circular buffer size at the network entity for rate matching. Rate matching, a starting point of each RV associated with a circular buffer, and HARQ combining may be aligned between the UE and the network entity.

For example, for downlink or for uplink, a circular buffer size at a transmitter (for rate matching) may correspond to (e.g., be the same as) a circular buffer size at a receiver (for HARQ combining). Tx rate matching and Rx HARQ combining may be aligned between the transmitter and the receiver. The transmitter may be a UE or a network entity. The receiver may be a UE or a network entity. The circular buffer sizes at the transmitter and the receiver may be indicated based at least in part on signaling between the transmitter and the receiver (e.g., between the UE and the network entity), where the signaling may include an indication of active HARQ processes (M) and an indication of a HARQ buffer size $N_{max}$.

In some aspects, the UE may transmit, to the network entity, capability signaling that indicates a total buffer size limit, maximum or minimum values for a maximum buffer size per active HARQ process, and/or a maximum or minimum quantity of active HARQ processes. In other words, the UE may transmit UE capability information for dynamic HARQ buffer management, and the UE capability information may include a total buffer size limit (e.g., $N_{total}$), maximum or minimum values for the maximum buffer size per active HARQ process (e.g., $N_{max}$), and/or a maximum or minimum quantity of active HARQ processes (e.g., M). The UE may receive, from the network entity, the indication associated with the LBRM per active HARQ process based at least in part on the capability signaling. The indication may indicate the HARQ buffer size for each active HARQ process.

As shown by reference number 504, the network entity may perform a rate matching based at least in part on the indication associated with the LBRM per active HARQ process. Rate matching may involve Tx rate matching (e.g., at the network entity) and Rx HARQ combining (e.g., at the UE). The network entity may perform the rate matching based at least in part on a maximum buffer size for an active HARQ process, as provided by the indication associated with the LBRM per active HARQ process.

As shown by reference number 506, the UE may perform a rate matching for incremental redundancy HARQ based at least in part on the indication associated with the LBRM per active HARQ process. Rate matching may involve Tx rate matching (e.g., at the network entity) and Rx HARQ combining (e.g., at the UE). The UE may perform the rate matching based at least in part on different RVs of the same data over multiple transmissions, including an initial transmission and one or more retransmissions. The rate matching may include HARQ combining for incremental redundancy HARQ. The HARQ buffer size for each active HARQ process, as provided by the indication associated with the LBRM received from the network entity, may enable the UE to perform the rate matching for incremental redundancy HARQ.

As indicated above, FIG. 5 is provided as an example. Other examples may differ from what is described with regard to FIG. 5.

Figure 6:
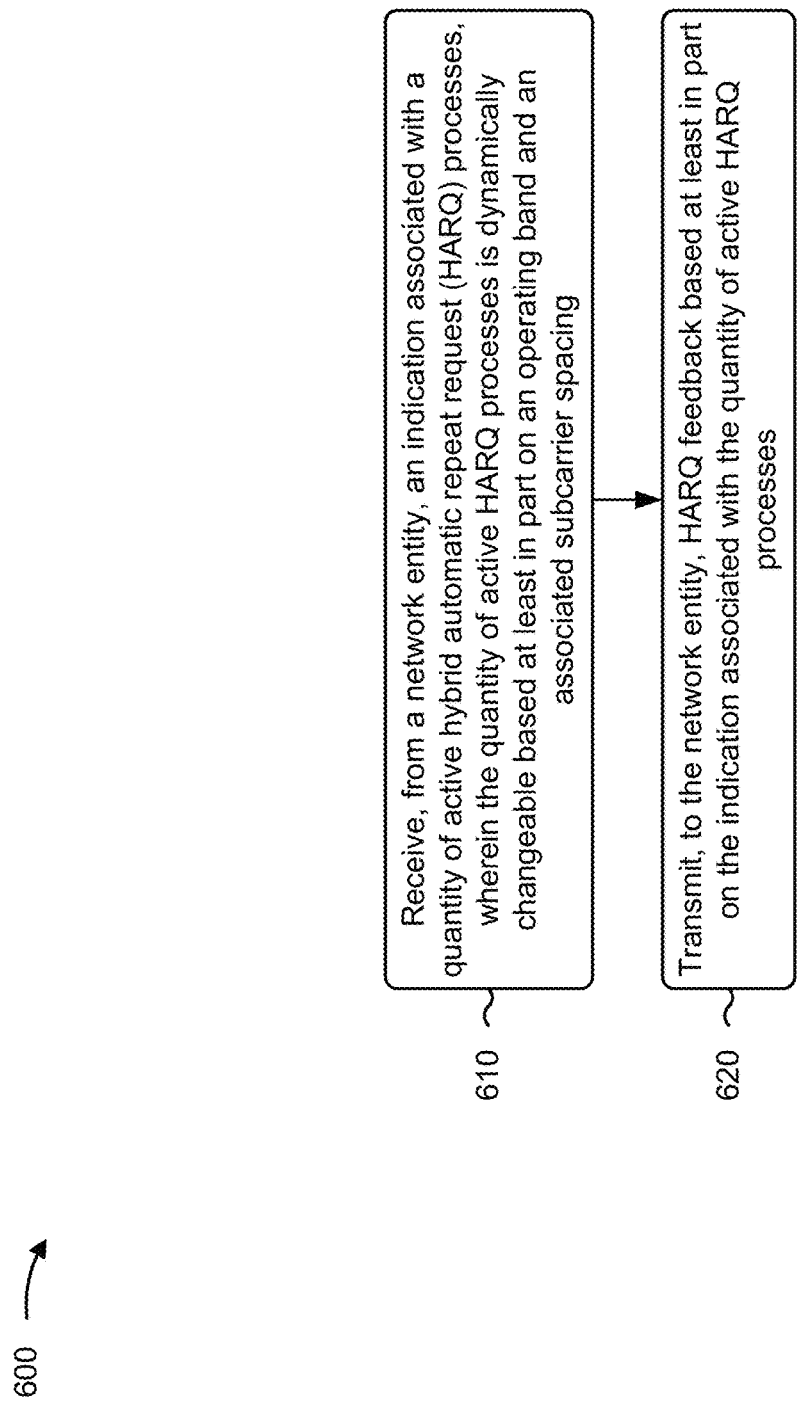
FIGS. 6-9 are diagrams illustrating example processes associated with HARQ feedback for active HARQ processes, in accordance with the present disclosure.

FIG. 6 is a diagram illustrating an example process 600 performed, for example, by a UE, in accordance with the present disclosure. Example process 600 is an example where the UE (e.g., UE 120) performs operations associated with HARQ feedback for active HARQ processes.

As shown in FIG. 6, in some aspects, process 600 may include receiving, from a network entity, an indication associated with a quantity of active HARQ processes, wherein the quantity of active HARQ processes is dynamically changeable based at least in part on an operating band and an associated subcarrier spacing (block 610). For example, the UE (e.g., using reception component 1002, depicted in FIG. 10) may receive, from a network entity, an indication associated with a quantity of active HARQ processes, wherein the quantity of active HARQ processes is dynamically changeable based at least in part on an operating band and an associated subcarrier spacing, as described above.

As further shown in FIG. 6, in some aspects, process 600 may include transmitting, to the network entity, HARQ feedback based at least in part on the indication associated with the quantity of active HARQ processes (block 620). For example, the UE (e.g., using transmission component 1004, depicted in FIG. 10) may transmit, to the network entity, HARQ feedback based at least in part on the indication associated with the quantity of active HARQ processes, as described above.

Process 600 may include additional aspects, such as any single aspect or any combination of aspects described below and/or in connection with one or more other processes described elsewhere herein.

In a first aspect, the indication indicates a subset of HARQ processes to be active from a set of semi-statically configured HARQ processes.

In a second aspect, alone or in combination with the first aspect, the indication is a dynamic parameter that indicates the quantity of active HARQ processes.

In a third aspect, alone or in combination with one or more of the first and second aspects, the indication is a second indication, process 600 includes transmitting, to the network entity, a first indication of a preferred quantity of active HARQ processes via uplink control information, a MAC-CE, or UE assistance information feedback, and receiving the indication comprises receiving the second indication based at least in part on the first indication.

In a fourth aspect, alone or in combination with one or more of the first through third aspects, receiving the indication comprises receiving the indication via downlink control information, a MAC-CE, or radio resource control signaling.

In a fifth aspect, alone or in combination with one or more of the first through fourth aspects, the quantity of active HARQ processes are associated with dynamic scheduling or semi-persistent scheduling.

In a sixth aspect, alone or in combination with one or more of the first through fifth aspects, the quantity of active HARQ processes are associated with consecutive HARQ process identifiers or non-consecutive HARQ process identifiers based at least in part on a bitmap.

In a seventh aspect, alone or in combination with one or more of the first through sixth aspects, a HARQ process number field in a scheduling downlink control information is based at least in part on a size of the quantity of active HARQ processes.

In an eighth aspect, alone or in combination with one or more of the first through seventh aspects, a HARQ process number field in a scheduling downlink control information is mapped to active HARQ process identifiers when the quantity of active HARQ processes are associated with non-consecutive HARQ process identifiers.

In a ninth aspect, alone or in combination with one or more of the first through eighth aspects, the indication is a first indication, and process 600 includes receiving, from the network entity, a second indication associated with a quantity of deactivated HARQ processes.

In a tenth aspect, alone or in combination with one or more of the first through ninth aspects, the quantity of active HARQ processes are associated with one of a downlink or an uplink.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
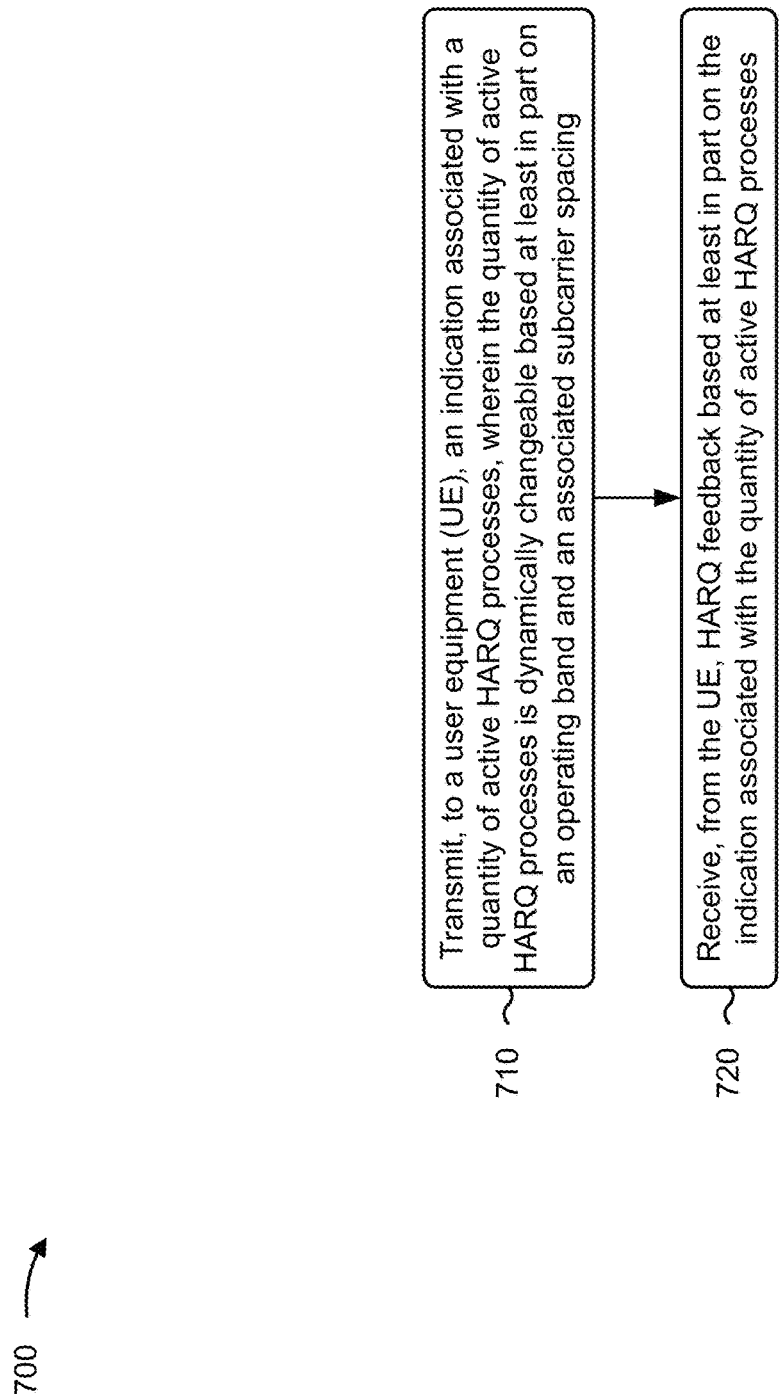

FIG. 7 is a diagram illustrating an example process 700 performed, for example, by a network entity, in accordance with the present disclosure. Example process 700 is an example where the network entity (e.g., base station 110) performs operations associated with HARQ feedback for active HARQ processes.

As shown in FIG. 7, in some aspects, process 700 may include transmitting, to a UE, an indication associated with a quantity of active HARQ processes, wherein the quantity of active HARQ processes is dynamically changeable based at least in part on an operating band and an associated subcarrier spacing (block 710). For example, the network entity (e.g., using transmission component 1104, depicted in FIG. 11) may transmit, to a UE, an indication associated with a quantity of active HARQ processes, wherein the quantity of active HARQ processes is dynamically changeable based at least in part on an operating band and an associated subcarrier spacing, as described above.

As further shown in FIG. 7, in some aspects, process 700 may include receiving, from the UE, HARQ feedback based at least in part on the indication associated with the quantity of active HARQ processes (block 720). For example, the network entity (e.g., using reception component 1102, depicted in FIG. 11) may receive, from the UE, HARQ feedback based at least in part on the indication associated with the quantity of active HARQ processes, as described above.

Process 700 may include additional aspects, such as any single aspect or any combination of aspects described below and/or in connection with one or more other processes described elsewhere herein.

In a first aspect, the indication indicates a subset of HARQ processes to be active from a set of semi-statically configured HARQ processes.

In a second aspect, alone or in combination with the first aspect, the indication is a dynamic parameter that indicates the quantity of active HARQ processes.

In a third aspect, alone or in combination with one or more of the first and second aspects, the indication is a second indication, process 700 includes receiving, from the UE, a first indication of a preferred quantity of active HARQ processes via uplink control information, a MAC-CE, or UE assistance information feedback, and transmitting the indication comprises transmitting the second indication based at least in part on the first indication.

In a fourth aspect, alone or in combination with one or more of the first through third aspects, transmitting the indication comprises transmitting the indication via downlink control information, a MAC-CE, or radio resource control signaling.

In a fifth aspect, alone or in combination with one or more of the first through fourth aspects, the quantity of active HARQ processes are associated with dynamic scheduling or semi-persistent scheduling.

In a sixth aspect, alone or in combination with one or more of the first through fifth aspects, the quantity of active HARQ processes are associated with consecutive HARQ process identifiers or non-consecutive HARQ process identifiers based at least in part on a bitmap.

In a seventh aspect, alone or in combination with one or more of the first through sixth aspects, a HARQ process number field in a scheduling downlink control information is based at least in part on a size of the quantity of active HARQ processes.

In an eighth aspect, alone or in combination with one or more of the first through seventh aspects, a HARQ process number field in a scheduling downlink control information is mapped to active HARQ process identifiers when the quantity of active HARQ processes are associated with non-consecutive HARQ process identifiers.

In a ninth aspect, alone or in combination with one or more of the first through eighth aspects, the indication is a first indication, and process 700 includes transmitting, to the UE, a second indication associated with a quantity of deactivated HARQ processes.

In a tenth aspect, alone or in combination with one or more of the first through ninth aspects, the quantity of active HARQ processes are associated with one of a downlink or an uplink.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
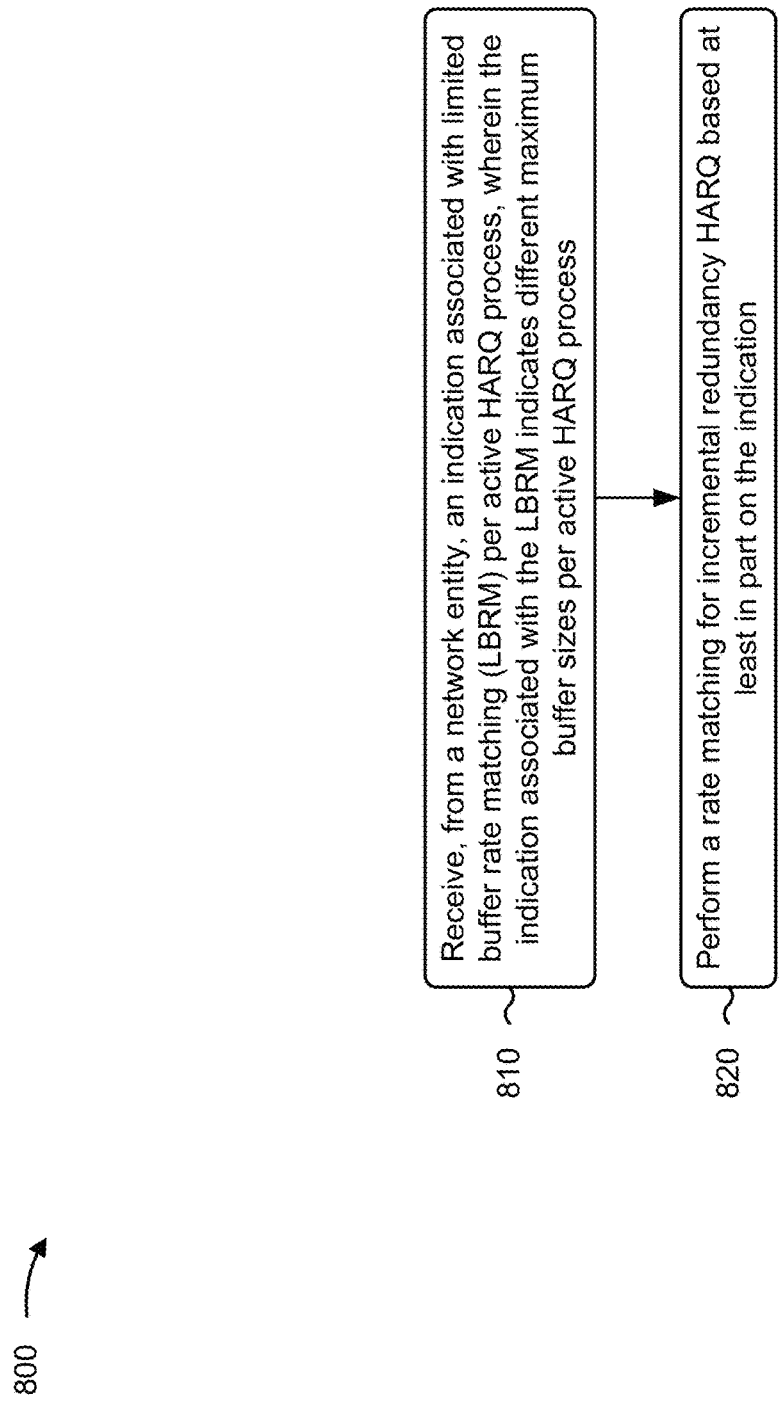

FIG. 8 is a diagram illustrating an example process 800 performed, for example, by a UE, in accordance with the present disclosure. Example process 800 is an example where the UE (e.g., UE 120) performs operations associated with HARQ feedback for active HARQ processes.

As shown in FIG. 8, in some aspects, process 800 may include receiving, from a network entity, an indication associated with LBRM per active HARQ process, wherein the indication associated with the LBRM indicates different maximum buffer sizes per active HARQ process (block 810). For example, the UE (e.g., using reception component 1002, depicted in FIG. 10) may receive, from a network entity, an indication associated with LBRM per active HARQ process, wherein the indication associated with the LBRM indicates different maximum buffer sizes per active HARQ process, as described above.

As further shown in FIG. 8, in some aspects, process 800 may include performing a rate matching for incremental redundancy HARQ based at least in part on the indication (block 820). For example, the UE (e.g., using performance component 1008, depicted in FIG. 10) may perform a rate matching for incremental redundancy HARQ based at least in part on the indication, as described above.

Process 800 may include additional aspects, such as any single aspect or any combination of aspects described below and/or in connection with one or more other processes described elsewhere herein.

In a first aspect, a total buffer size is equally divided by a quantity of active HARQ processes and assigned to each of the quantity of active HARQ processes.

In a second aspect, alone or in combination with the first aspect, the indication indicates a maximum buffer size that is specific to a single active HARQ process.

In a third aspect, alone or in combination with one or more of the first and second aspects, receiving the indication comprises receiving the indication via a semi-static assignment via RRC signaling and/or a MAC-CE.

In a fourth aspect, alone or in combination with one or more of the first through third aspects, the indication is a second indication, process 800 includes transmitting, to the network entity, a first indication of a preferred buffer size via uplink control information, a MAC-CE, or UE assistance information feedback, and receiving the indication comprises receiving the second indication based at least in part on the first indication.

In a fifth aspect, alone or in combination with one or more of the first through fourth aspects, receiving the indication comprises receiving the indication via a dynamic assignment.

In a sixth aspect, alone or in combination with one or more of the first through fifth aspects, scheduling DCI includes a field indicating a maximum buffer size for scheduled data, and a listing of candidate maximum buffer sizes is configured and an index of the listing is indicated in the scheduling DCI.

In a seventh aspect, alone or in combination with one or more of the first through sixth aspects, an aggregation of maximum buffer sizes for a plurality of active HARQ processes does not exceed a UE capability.

In an eighth aspect, alone or in combination with one or more of the first through seventh aspects, the indication indicates a zero buffer size for a specific active HARQ process, and no HARQ combining is permitted for a HARQ identifier associated with the specific active HARQ process.

In a ninth aspect, alone or in combination with one or more of the first through eighth aspects, a circular buffer size at the UE for HARQ combining corresponds to a circular buffer size at the network entity for rate matching.

In a tenth aspect, alone or in combination with one or more of the first through ninth aspects, rate matching, a starting point of each redundancy version associated with a circular buffer, and HARQ combining are aligned between the UE and the network entity.

In an eleventh aspect, alone or in combination with one or more of the first through tenth aspects, process 800 includes transmitting, to the network entity, capability signaling that indicates one or more of a total buffer size limit, maximum or minimum values for a maximum buffer size per active HARQ process, or a maximum or minimum quantity of active HARQ processes, and receiving the indication comprises receiving the indication based at least in part on the capability signaling.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
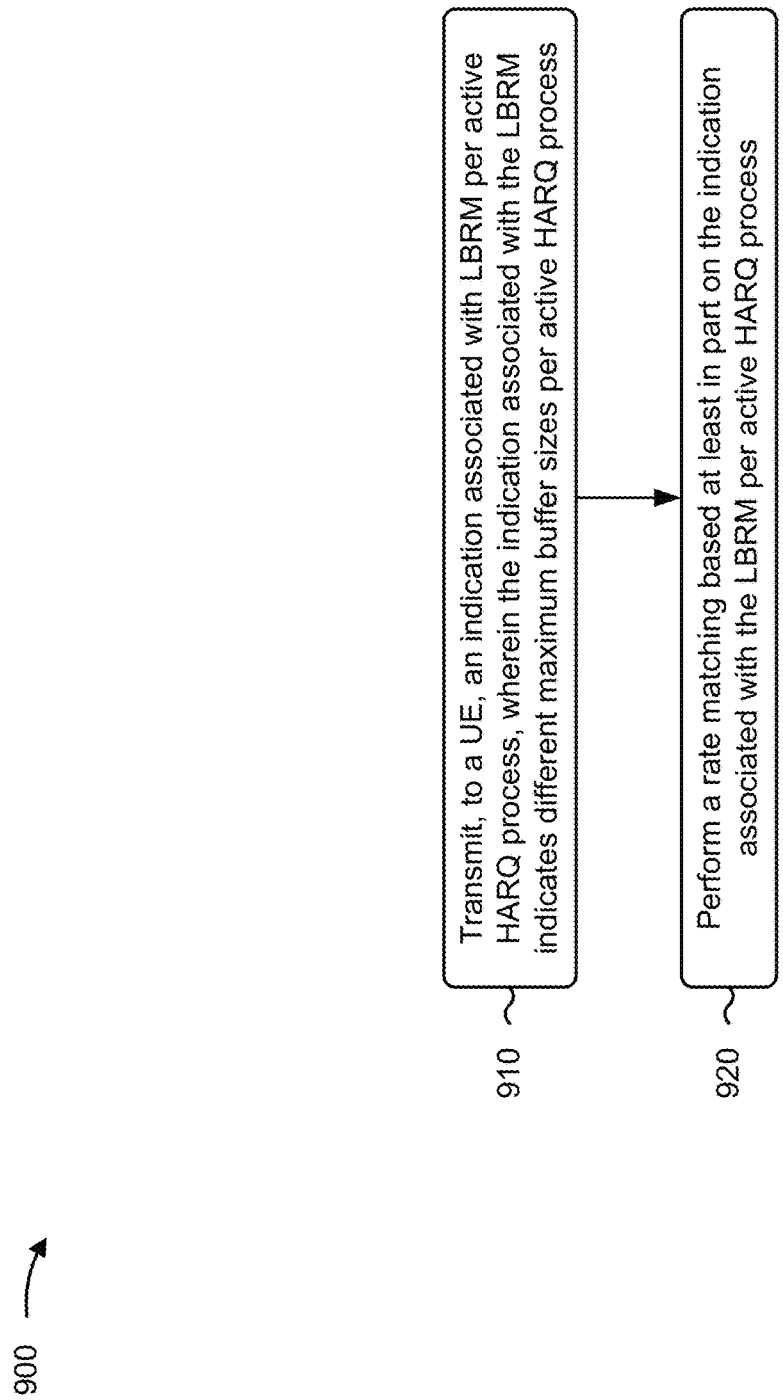

FIG. 9 is a diagram illustrating an example process 900 performed, for example, by a network entity, in accordance with the present disclosure. Example process 900 is an example where the network entity (e.g., base station 110) performs operations associated with HARQ feedback for active HARQ processes.

As shown in FIG. 9, in some aspects, process 900 may include transmitting, to a UE, an indication associated with LBRM per active HARQ process, wherein the indication associated with the LBRM indicates different maximum buffer sizes per active HARQ process (block 910). For example, the network entity (e.g., using transmission component 1104, depicted in FIG. 11) may transmit, to a UE, an indication associated with LBRM per active HARQ process, wherein the indication associated with the LBRM indicates different maximum buffer sizes per active HARQ process, as described above.

As further shown in FIG. 9, in some aspects, process 900 may include performing a rate matching based at least in part on the indication associated with the LBRM per active HARQ process (block 920). For example, the network entity (e.g., using performance component 1108, depicted in FIG. 11) may perform a rate matching based at least in part on the indication associated with the LBRM per active HARQ process, as described above.

Process 900 may include additional aspects, such as any single aspect or any combination of aspects described below and/or in connection with one or more other processes described elsewhere herein.

In a first aspect, a total buffer size is equally divided by a quantity of active HARQ processes and assigned to each of the quantity of active HARQ processes.

In a second aspect, alone or in combination with the first aspect, the indication indicates a maximum buffer size that is specific to a single active HARQ process.

In a third aspect, alone or in combination with one or more of the first and second aspects, transmitting the indication comprises receiving the transmitting via a semi-static assignment via RRC signaling and/or a MAC-CE.

In a fourth aspect, alone or in combination with one or more of the first through third aspects, the indication is a second indication, and process 900 includes receiving, from the UE, a first indication of a preferred buffer size via uplink control information, a MAC-CE, or UE assistance information feedback, and transmitting the indication comprises transmitting the second indication based at least in part on the first indication.

In a fifth aspect, alone or in combination with one or more of the first through fourth aspects, transmitting the indication comprises transmitting the indication via a dynamic assignment.

In a sixth aspect, alone or in combination with one or more of the first through fifth aspects, scheduling DCI includes a field indicating a maximum buffer size for scheduled data, and a listing of candidate maximum buffer sizes is configured and an index of the listing is indicated in the scheduling DCI.

In a seventh aspect, alone or in combination with one or more of the first through sixth aspects, an aggregation of maximum buffer sizes for a plurality of active HARQ processes does not exceed a UE capability.

In an eighth aspect, alone or in combination with one or more of the first through seventh aspects, the indication indicates a zero buffer size for a specific active HARQ process, and no HARQ combining is permitted for a HARQ identifier associated with the specific active HARQ process.

In a ninth aspect, alone or in combination with one or more of the first through eighth aspects, a circular buffer size at the UE for HARQ combining corresponds to a circular buffer size at the network entity for rate matching.

In a tenth aspect, alone or in combination with one or more of the first through ninth aspects, rate matching, a starting point of each redundancy version associated with a circular buffer, and HARQ combining are aligned between the network entity and the UE.

In an eleventh aspect, alone or in combination with one or more of the first through tenth aspects, process 900 includes receiving, from the UE, capability signaling that indicates one or more of a total buffer size limit, maximum or minimum values for a maximum buffer size per active HARQ process, or a maximum or minimum quantity of active HARQ processes, and transmitting the indication comprises transmitting the indication based at least in part on the capability signaling.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
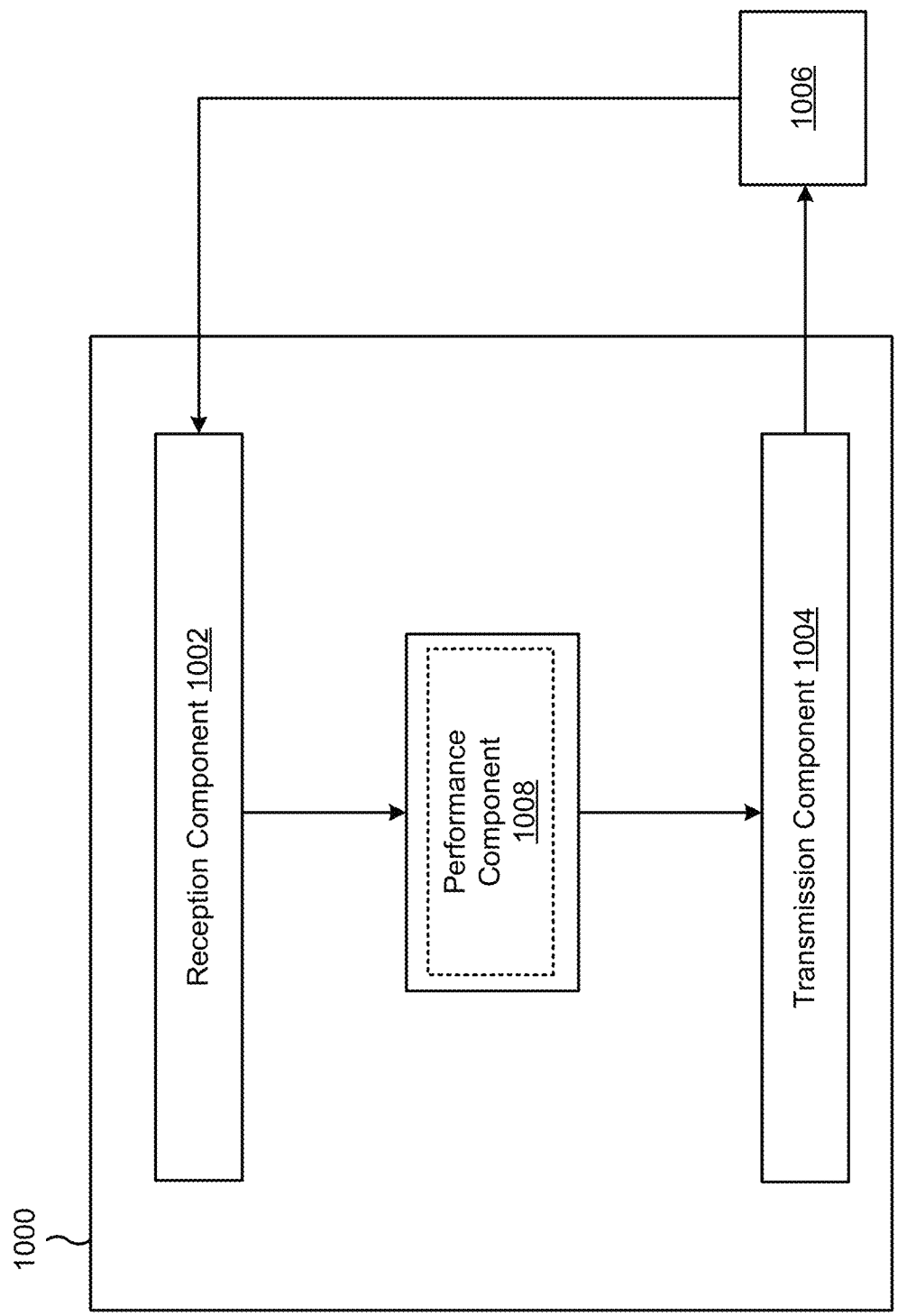
FIGS. 10-11 are block diagrams of example apparatuses for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a performance component 1008, among other examples.

In some aspects, the apparatus 1000 may be configured to perform one or more operations described herein in connection with FIGS. 4-5. Additionally, or alternatively, the apparatus 1000 may be configured to perform one or more processes described herein, such as process 600 of FIG. 6, process 800 of FIG. 8, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The reception component 1002 may receive, from a network entity, an indication associated with a quantity of active HARQ processes, wherein the quantity of active HARQ processes is dynamically changeable based at least in part on an operating band and an associated subcarrier spacing. The transmission component 1004 may transmit, to the network entity, HARQ feedback based at least in part on the indication associated with the quantity of active HARQ processes.

The reception component 1002 may receive, from a network entity, an indication associated with LBRM per active HARQ process, wherein the indication associated with the LBRM indicates different maximum buffer sizes per active HARQ process. The performance component 1008 may perform a rate matching for incremental redundancy HARQ based at least in part on the indication. The transmission component 1004 may transmit, to the network entity, capability signaling that indicates one or more of: a total buffer size limit, maximum or minimum values for a maximum buffer size per active HARQ process, or a maximum or minimum quantity of active HARQ processes.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
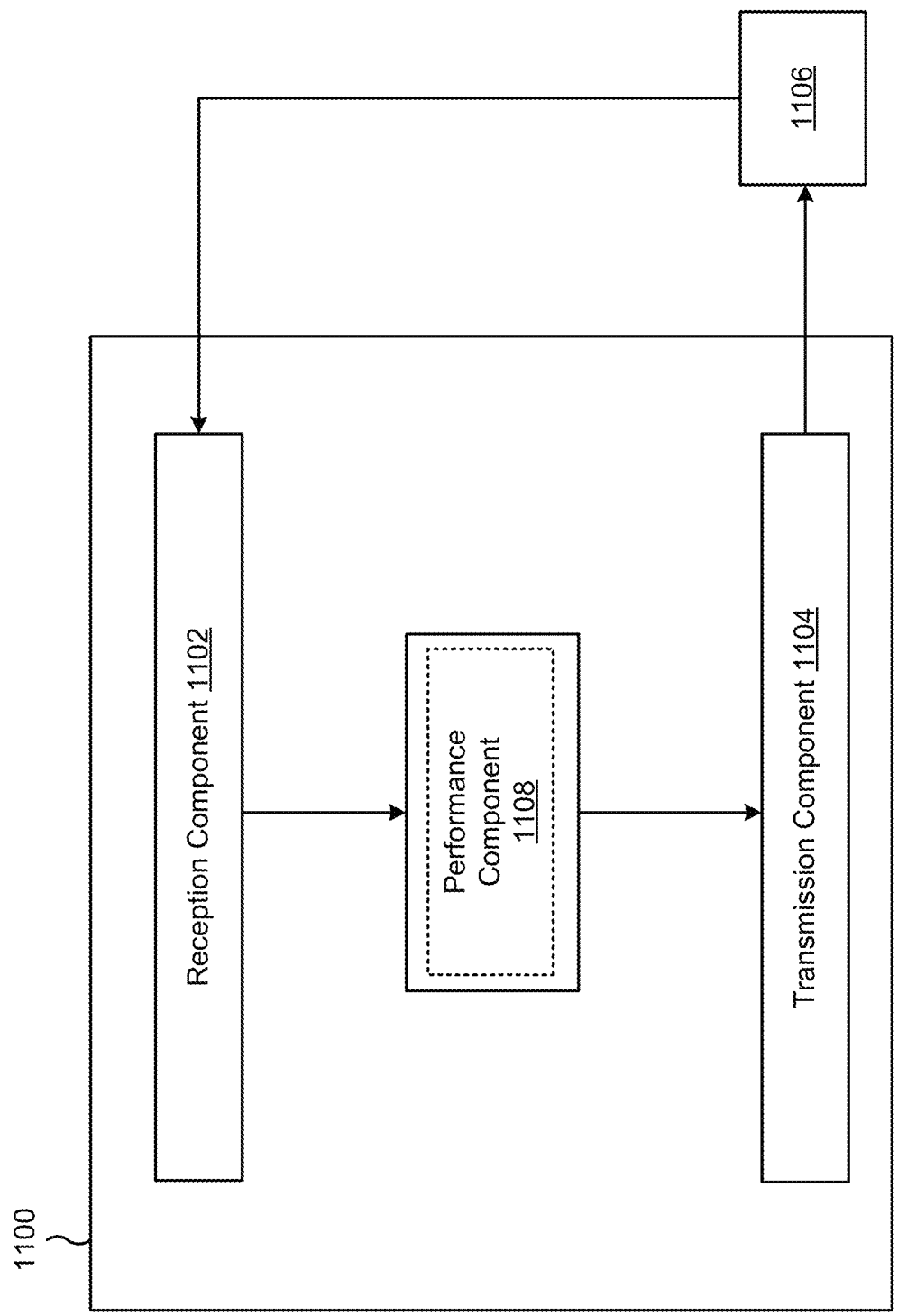

FIG. 11 is a block diagram of an example apparatus 1100 for wireless communication. The apparatus 1100 may be a network entity, or a network entity may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a performance component 1108, among other examples.

In some aspects, the apparatus 1100 may be configured to perform one or more operations described herein in connection with FIGS. 4-5. Additionally, or alternatively, the apparatus 1100 may be configured to perform one or more processes described herein, such as process 700 of FIG. 7, process 900 of FIG. 9, or a combination thereof. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The transmission component 1104 may transmit, to a UE, an indication associated with a quantity of active HARQ processes, wherein the quantity of active HARQ processes is dynamically changeable based at least in part on an operating band and an associated subcarrier spacing. The reception component 1102 may receive, from the UE, HARQ feedback based at least in part on the indication associated with the quantity of active HARQ processes.

The transmission component 1104 may transmit, to a UE, an indication associated with LBRM per active HARQ process, wherein the indication associated with the LBRM indicates different maximum buffer sizes per active HARQ process. The performance component 1108 may perform a rate matching based at least in part on the indication associated with the LBRM per active HARQ process. The reception component 1102 may receive, from the UE, capability signaling that indicates one or more of: a total buffer size limit, maximum or minimum values for a maximum buffer size per active HARQ process, or a maximum or minimum quantity of active HARQ processes.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
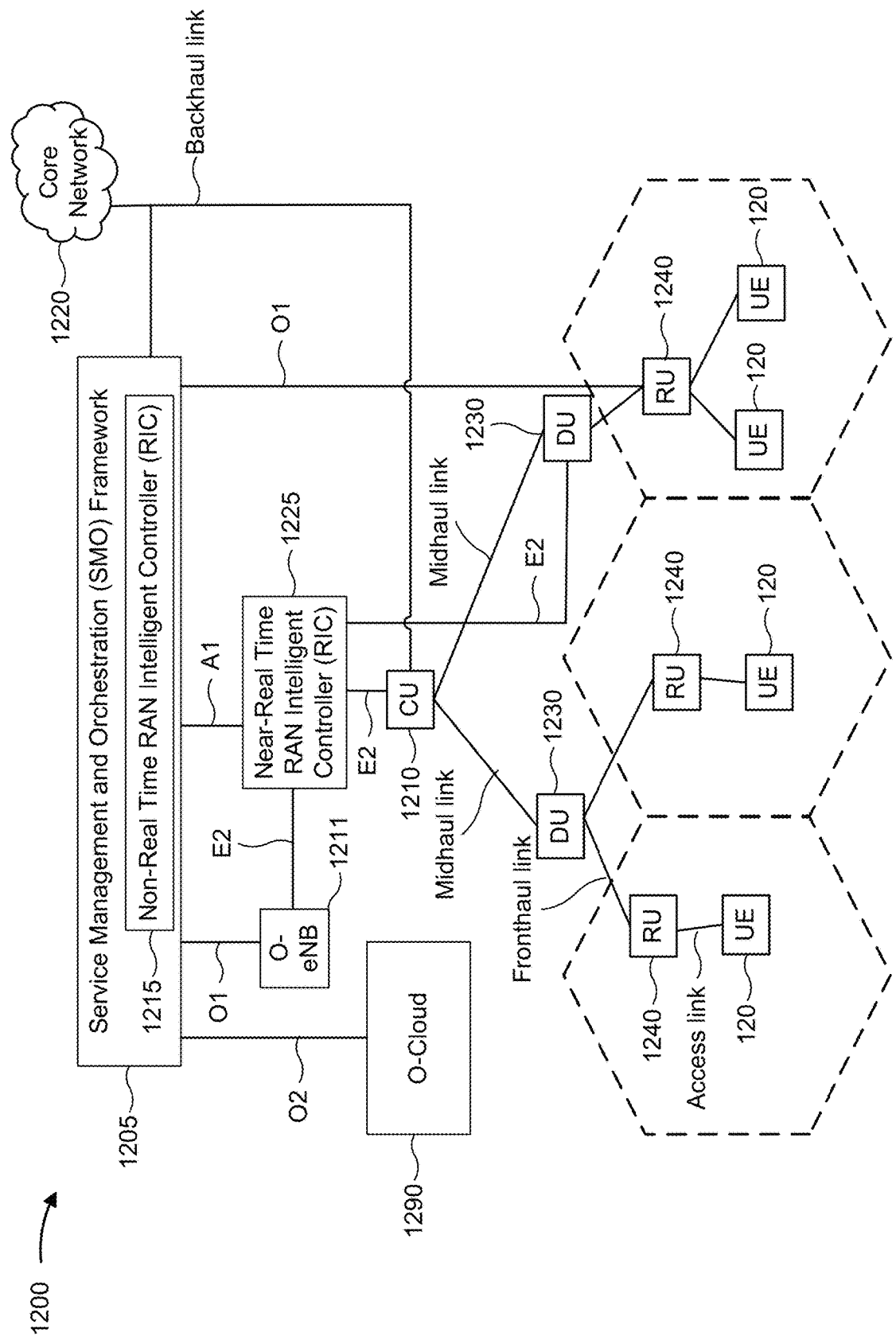
FIG. 12 is a diagram illustrating an example of a disaggregated base station architecture, in accordance with the present disclosure.

FIG. 12 is a diagram illustrating an example 1200 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 12 may include one or more CUs 1210 that can communicate directly with a core network 1220 via a backhaul link, or indirectly with the core network 1220 through one or more disaggregated base station units (such as a Near-RT RIC 1225 via an E2 link, or a Non-RT RIC 1215 associated with a Service Management and Orchestration (SMO) Framework 1205, or both). A CU 1210 may communicate with one or more DUs 1230 via respective midhaul links, such as an F1 interface. The DUs 1230 may communicate with one or more RUs 1240 via respective fronthaul links. The RUs 1240 may communicate with respective UEs 120 via one or more radio frequency (RF) access links. In some implementations, the UE 120 may be simultaneously served by multiple RUs 1240.

Each of the units (e.g., the CUs 1210, the DUs 1230, the RUs 1240), as well as the Near-RT RICs 1225, the Non-RT RICs 1215, and the SMO Framework 1205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1210. The CU 1210 may be configured to handle user plane functionality (e.g., Central Unit—User Plane (CU-UP)), control plane functionality (e.g., Central Unit—Control Plane (CU-CP)), or a combination thereof. In some implementations, the CU 1210 can be logically split into one or more CU-UP units and one or more CU-CP units. The CU-UP unit can communicate bidirectionally with the CU-CP unit via an interface, such as the E1 interface when implemented in an O-RAN configuration. The CU 1210 can be implemented to communicate with the DU 1230, as necessary, for network control and signaling.

The DU 1230 may correspond to a logical unit that includes one or more base station functions to control the operation of one or more RUs 1240. In some aspects, the DU 1230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1230 may further host one or more low-PHY layers. Each layer (or module) can be implemented with an interface configured to communicate signals with other layers (and modules) hosted by the DU 1230, or with the control functions hosted by the CU 1210.

Lower-layer functionality can be implemented by one or more RUs 1240. In some deployments, an RU 1240, controlled by a DU 1230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1240 can be implemented to handle over the air (OTA) communication with one or more UEs 120. In some implementations, real-time and non-real-time aspects of control and user plane communication with the RU(s) 1240 can be controlled by the corresponding DU 1230. In some scenarios, this configuration can enable the DU(s) 1230 and the CU 1210 to be implemented in a cloud-based RAN architecture, such as a vRAN architecture.

The SMO Framework 1205 may be configured to support RAN deployment and provisioning of non-virtualized and virtualized network elements. For non-virtualized network elements, the SMO Framework 1205 may be configured to support the deployment of dedicated physical resources for RAN coverage requirements which may be managed via an operations and maintenance interface (such as an O1 interface). For virtualized network elements, the SMO Framework 1205 may be configured to interact with a cloud computing platform (such as an open cloud (O-Cloud) 1290) to perform network element life cycle management (such as to instantiate virtualized network elements) via a cloud computing platform interface (such as an O2 interface). Such virtualized network elements can include, but are not limited to, CUs 1210, DUs 1230, RUs 1240 and Near-RT RICs 1225. In some implementations, the SMO Framework 1205 can communicate with a hardware aspect of a 4G RAN, such as an open eNB (O-eNB) 1211, via an O1 interface. Additionally, in some implementations, the SMO Framework 1205 can communicate directly with one or more RUs 1240 via an O1 interface. The SMO Framework 1205 also may include a Non-RT RIC 1215 configured to support functionality of the SMO Framework 1205.

The Non-RT RIC 1215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1225. The Non-RT RIC 1215 may be coupled to or communicate with (such as via an A1 interface) the Near-RT RIC 1225. The Near-RT RIC 1225 may be configured to include a logical function that enables near-real-time control and optimization of RAN elements and resources via data collection and actions over an interface (such as via an E2 interface) connecting one or more CUs 1210, one or more DUs 1230, or both, as well as an O-eNB, with the Near-RT RIC 1225.

In some implementations, to generate AI/ML models to be deployed in the Near-RT RIC 1225, the Non-RT RIC 1215 may receive parameters or external enrichment information from external servers. Such information may be utilized by the Near-RT RIC 1225 and may be received at the SMO Framework 1205 or the Non-RT RIC 1215 from non-network data sources or from network functions. In some examples, the Non-RT RIC 1215 or the Near-RT RIC 1225 may be configured to tune RAN behavior or performance. For example, the Non-RT RIC 1215 may monitor long-term trends and patterns for performance and employ AI/ML models to perform corrective actions through the SMO Framework 1205 (such as reconfiguration via O1) or via creation of RAN management policies (such as A1 policies).

As indicated above, FIG. 12 is provided as an example. Other examples may differ from what is described with regard to FIG. 12.

The following provides an overview of some Aspects of the present disclosure:

Aspect 1: A method of wireless communication performed by a user equipment (UE), comprising: receiving, from a network entity, an indication associated with a quantity of active hybrid automatic repeat request (HARQ) processes, wherein the quantity of active HARQ processes is dynamically changeable based at least in part on an operating band and an associated subcarrier spacing; and transmitting, to the network entity, HARQ feedback based at least in part on the indication associated with the quantity of active HARQ processes.

Aspect 2: The method of Aspect 1, wherein the indication indicates a subset of HARQ processes to be active from a set of semi-statically configured HARQ processes.

Aspect 3: The method of any of Aspects 1 through 2, wherein the indication is a dynamic parameter that indicates the quantity of active HARQ processes.

Aspect 4: The method of any of Aspects 1 through 3, wherein the indication is a second indication, and further comprising: transmitting, to the network entity, a first indication of a preferred quantity of active HARQ processes via uplink control information, a media access control control element, or UE assistance information feedback, and wherein receiving the indication comprises receiving the second indication based at least in part on the first indication.

Aspect 5: The method of any of Aspects 1 through 4, wherein receiving the indication comprises receiving the indication via downlink control information, a media access control control element, or radio resource control signaling.

Aspect 6: The method of any of Aspects 1 through 5, wherein the quantity of active HARQ processes are associated with dynamic scheduling or semi-persistent scheduling.

Aspect 7: The method of any of Aspects 1 through 6, wherein the quantity of active HARQ processes are associated with consecutive HARQ process identifiers or non-consecutive HARQ process identifiers based at least in part on a bitmap.

Aspect 8: The method of any of Aspects 1 through 7, wherein a HARQ process number field in a scheduling downlink control information is based at least in part on a size of the quantity of active HARQ processes.

Aspect 9: The method of any of Aspects 1 through 8, wherein a HARQ process number field in a scheduling downlink control information is mapped to active HARQ process identifiers when the quantity of active HARQ processes are associated with non-consecutive HARQ process identifiers.

Aspect 10: The method of any of Aspects 1 through 9, wherein the indication is a first indication, and further comprising: receiving, from the network entity, a second indication associated with a quantity of deactivated HARQ processes.

Aspect 11: The method of any of Aspects 1 through 10, wherein the quantity of active HARQ processes are associated with one of a downlink or an uplink.

Aspect 12: A method of wireless communication performed by a network entity, comprising: transmitting, to a user equipment (UE), an indication associated with a quantity of active hybrid automatic repeat request (HARQ)

processes, wherein the quantity of active HARQ processes is dynamically changeable based at least in part on an operating band and an associated subcarrier spacing; and receiving, from the UE, HARQ feedback based at least in part on the indication associated with the quantity of active HARQ processes.

Aspect 13: The method of Aspect 12, wherein the indication indicates a subset of HARQ processes to be active from a set of semi-statically configured HARQ processes.

Aspect 14: The method of any of Aspects 12 through 13, wherein the indication is a dynamic parameter that indicates the quantity of active HARQ processes.

Aspect 15: The method of any of Aspects 12 through 14, wherein the indication is a second indication, and further comprising: receiving, from the UE, a first indication of a preferred quantity of active HARQ processes via uplink control information, a media access control control element, or UE assistance information feedback, and wherein transmitting the indication comprises transmitting the second indication based at least in part on the first indication.

Aspect 16: The method of any of Aspects 12 through 15, wherein transmitting the indication comprises transmitting the indication via downlink control information, a media access control control element, or radio resource control signaling.

Aspect 17: The method of any of Aspects 12 through 16, wherein the quantity of active HARQ processes are associated with dynamic scheduling or semi-persistent scheduling.

Aspect 18: The method of any of Aspects 12 through 17, wherein the quantity of active HARQ processes are associated with consecutive HARQ process identifiers or non-consecutive HARQ process identifiers based at least in part on a bitmap.

Aspect 19: The method of any of Aspects 12 through 18, wherein a HARQ process number field in a scheduling downlink control information is based at least in part on a size of the quantity of active HARQ processes.

Aspect 20: The method of any of Aspects 12 through 19, wherein a HARQ process number field in a scheduling downlink control information is mapped to active HARQ process identifiers when the quantity of active HARQ processes are associated with non-consecutive HARQ process identifiers.

Aspect 21: The method of any of Aspects 12 through 20, wherein the indication is a first indication, and further comprising: transmitting, to the UE, a second indication associated with a quantity of deactivated HARQ processes.

Aspect 22: The method of any of Aspects 12 through 21, wherein the quantity of active HARQ processes are associated with one of a downlink or an uplink.

Aspect 23: A method of wireless communication performed by a user equipment (UE), comprising: receiving, from a network entity, an indication associated with limited buffer rate matching (LBRM) per active hybrid automatic repeat request (HARQ) process, wherein the indication associated with the LBRM indicates different maximum buffer sizes per active HARQ process; and performing a rate matching for incremental redundancy HARQ based at least in part on the indication.

Aspect 24: The method of Aspect 23, wherein a total buffer size is equally divided by a quantity of active HARQ processes and assigned to each of the quantity of active HARQ processes.

Aspect 25: The method of any of Aspects 23 through 24, wherein the indication indicates a maximum buffer size that is specific to a single active HARQ process.

Aspect 26: The method of any of Aspects 23 through 25, wherein receiving the indication comprises receiving the indication via a semi-static assignment via radio resource control signaling or a media access control control element.

Aspect 27: The method of any of Aspects 23 through 26, wherein the indication is a second indication, and further comprising: transmitting, to the network entity, a first indication of a preferred buffer size via uplink control information, a media access control control element, or UE assistance information feedback, and wherein receiving the indication comprises receiving the second indication based at least in part on the first indication.

Aspect 28: The method of any of Aspects 23 through 27, wherein receiving the indication comprises receiving the indication via a dynamic assignment.

Aspect 29: The method of any of Aspects 23 through 28, wherein scheduling downlink control information (DCI) includes a field indicating a maximum buffer size for scheduled data, and wherein a listing of candidate maximum buffer sizes is configured and an index of the listing is indicated in the scheduling DCI.

Aspect 30: The method of any of Aspects 23 through 29, wherein an aggregation of maximum buffer sizes for a plurality of active HARQ processes does not exceed a UE capability.

Aspect 31: The method of any of Aspects 23 through 30, wherein the indication indicates a zero buffer size for a specific active HARQ process, and wherein no HARQ combining is permitted for a HARQ identifier associated with the specific active HARQ process.

Aspect 32: The method of any of Aspects 23 through 31, wherein a circular buffer size at the UE for HARQ combining corresponds to a circular buffer size at the network entity for rate matching.

Aspect 33: The method of any of Aspects 23 through 32, wherein rate matching, a starting point of each redundancy version associated with a circular buffer, and HARQ combining are aligned between the UE and the network entity.

Aspect 34: The method of any of Aspects 23 through 33, further comprising: transmitting, to the network entity, capability signaling that indicates one or more of: a total buffer size limit, maximum or minimum values for a maximum buffer size per active HARQ process, or a maximum or minimum quantity of active HARQ processes; and wherein receiving the indication comprises receiving the indication based at least in part on the capability signaling. wherein receiving the indication comprises receiving the indication based at least in part on the capability signaling.

Aspect 35: A method of wireless communication performed by a network entity, comprising: transmitting, to a user equipment (UE), an indication associated with limited buffer rate matching (LBRM) per active hybrid automatic repeat request (HARQ) process, wherein the indication associated with the LBRM indicates different maximum buffer sizes per active HARQ process; and performing a rate matching based at least in part on the indication associated with the LBRM per active HARQ process.

Aspect 36: The method of Aspect 35, wherein a total buffer size is equally divided by a quantity of active HARQ processes and assigned to each of the quantity of active HARQ processes.

Aspect 37: The method of any of Aspects 35 through 36, wherein the indication indicates a maximum buffer size that is specific to a single active HARQ process.

Aspect 38: The method of any of Aspects 35 through 37, wherein transmitting the indication comprises receiving the transmitting via a semi-static assignment via radio resource control signaling or a media access control control element.

Aspect 39: The method of any of Aspects 35 through 38, wherein the indication is a second indication, and further comprising: receiving, from the UE, a first indication of a preferred buffer size via uplink control information, a media access control control element, or UE assistance information feedback, and wherein transmitting the indication comprises transmitting the second indication based at least in part on the first indication.

Aspect 40: The method of any of Aspects 35 through 39, wherein transmitting the indication comprises transmitting the indication via a dynamic assignment.

Aspect 41: The method of any of Aspects 35 through 40, wherein scheduling downlink control information (DCI) includes a field indicating a maximum buffer size for scheduled data, and wherein a listing of candidate maximum buffer sizes is configured and an index of the listing is indicated in the scheduling DCI.

Aspect 42: The method of any of Aspects 35 through 41, wherein an aggregation of maximum buffer sizes for a plurality of active HARQ processes does not exceed a UE capability.

Aspect 43: The method of any of Aspects 35 through 42, wherein the indication indicates a zero buffer size for a specific active HARQ process, and wherein no HARQ combining is permitted for a HARQ identifier associated with the specific active HARQ process.

Aspect 44: The method of any of Aspects 35 through 43, wherein a circular buffer size at the UE for HARQ combining corresponds to a circular buffer size at the network entity for rate matching.

Aspect 45: The method of any of Aspects 35 through 44, wherein rate matching, a starting point of each redundancy version associated with a circular buffer, and HARQ combining are aligned between the network entity and the UE.

Aspect 46: The method of any of Aspects 35 through 45, further comprising: receiving, from the UE, capability signaling that indicates one or more of: a total buffer size limit, maximum or minimum values for a maximum buffer size per active HARQ process, or a maximum or minimum quantity of active HARQ processes; and wherein transmitting the indication comprises transmitting the indication based at least in part on the capability signaling. wherein transmitting the indication comprises transmitting the indication based at least in part on the capability signaling.

Aspect 47: An apparatus for wireless communication at a device, comprising a processor; memory coupled with the processor; and instructions stored in the memory and executable by the processor to cause the apparatus to perform the method of one or more Aspects of Aspects 1-11.

Aspect 48: A device for wireless communication, comprising a memory and one or more processors coupled to the memory, the one or more processors configured to perform the method of one or more Aspects of Aspects 1-11.

Aspect 49: An apparatus for wireless communication, comprising at least one means for performing the method of one or more Aspects of Aspects 1-11.

Aspect 50: A non-transitory computer-readable medium storing code for wireless communication, the code comprising instructions executable by a processor to perform the method of one or more Aspects of Aspects 1-11.

Aspect 51: A non-transitory computer-readable medium storing a set of instructions for wireless communication, the set of instructions comprising one or more instructions that, when executed by one or more processors of a device, cause the device to perform the method of one or more Aspects of Aspects 1-11.

Aspect 52: An apparatus for wireless communication at a device, comprising a processor; memory coupled with the processor; and instructions stored in the memory and executable by the processor to cause the apparatus to perform the method of one or more Aspects of Aspects 12-22.

Aspect 53: A device for wireless communication, comprising a memory and one or more processors coupled to the memory, the one or more processors configured to perform the method of one or more Aspects of Aspects 12-22.

Aspect 54: An apparatus for wireless communication, comprising at least one means for performing the method of one or more Aspects of Aspects 12-22.

Aspect 55: A non-transitory computer-readable medium storing code for wireless communication, the code comprising instructions executable by a processor to perform the method of one or more Aspects of Aspects 12-22.

Aspect 56: A non-transitory computer-readable medium storing a set of instructions for wireless communication, the set of instructions comprising one or more instructions that, when executed by one or more processors of a device, cause the device to perform the method of one or more Aspects of Aspects 12-22.

Aspect 57: An apparatus for wireless communication at a device, comprising a processor; memory coupled with the processor; and instructions stored in the memory and executable by the processor to cause the apparatus to perform the method of one or more Aspects of Aspects 23-34.

Aspect 58: A device for wireless communication, comprising a memory and one or more processors coupled to the memory, the one or more processors configured to perform the method of one or more Aspects of Aspects 23-34.

Aspect 59: An apparatus for wireless communication, comprising at least one means for performing the method of one or more Aspects of Aspects 23-34.

Aspect 60: A non-transitory computer-readable medium storing code for wireless communication, the code comprising instructions executable by a processor to perform the method of one or more Aspects of Aspects 23-34.

Aspect 61: A non-transitory computer-readable medium storing a set of instructions for wireless communication, the set of instructions comprising one or more instructions that, when executed by one or more processors of a device, cause the device to perform the method of one or more Aspects of Aspects 23-34.

Aspect 62: An apparatus for wireless communication at a device, comprising a processor; memory coupled with the processor; and instructions stored in the memory and executable by the processor to cause the apparatus to perform the method of one or more Aspects of Aspects 35-46.

Aspect 63: A device for wireless communication, comprising a memory and one or more processors coupled to the memory, the one or more processors configured to perform the method of one or more Aspects of Aspects 35-46.

Aspect 64: An apparatus for wireless communication, comprising at least one means for performing the method of one or more Aspects of Aspects 35-46.

Aspect 65: A non-transitory computer-readable medium storing code for wireless communication, the code comprising instructions executable by a processor to perform the method of one or more Aspects of Aspects 35-46.

Aspect 66: A non-transitory computer-readable medium storing a set of instructions for wireless communication, the set of instructions comprising one or more instructions that, when executed by one or more processors of a device, cause the device to perform the method of one or more Aspects of Aspects 35-46.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive, from a network entity, an indication associated with a quantity of active hybrid automatic repeat request (HARQ) processes, wherein the quantity of active HARQ processes is dynamically changeable based at least in part on an operating band and an associated subcarrier spacing, wherein the quantity of active HARQ processes is associated with consecutive HARQ process identifiers or non-consecutive HARQ process identifiers based at least in part on a bitmap; and
        transmit, to the network entity, HARQ feedback based at least in part on the indication associated with the quantity of active HARQ processes.

2. The UE of claim 1, wherein the indication indicates a subset of HARQ processes to be active from a set of semi-statically configured HARQ processes.

3. The UE of claim 1, wherein the indication is a dynamic parameter that indicates the quantity of active HARQ processes.

4. The UE of claim 1, wherein the indication is a second indication, and wherein:
    the one or more processors are further configured to transmit, to the network entity, a first indication of a preferred quantity of active HARQ processes via uplink control information, a media access control control element, or UE assistance information feedback, and
    the one or more processors, to receive the indication, are configured to receive the second indication based at least in part on the first indication.

5. The UE of claim 1, wherein the one or more processors, to receive the indication, are configured to receive the indication via downlink control information, a media access control control element, or radio resource control signaling.

6. The UE of claim 1, wherein the quantity of active HARQ processes are associated with dynamic scheduling or semi-persistent scheduling.

7. The UE of claim 1, wherein a HARQ process number field in a scheduling downlink control information is based at least in part on a size of the quantity of active HARQ processes.

8. The UE of claim 1, wherein a HARQ process number field in a scheduling downlink control information is mapped to active HARQ process identifiers when the quantity of active HARQ processes are associated with non-consecutive HARQ process identifiers.

9. The UE of claim 1, wherein the indication is a first indication, and wherein the one or more processors are further configured to:
    receive, from the network entity, a second indication associated with a quantity of deactivated HARQ processes.

10. The UE of claim 1, wherein the quantity of active HARQ processes are associated with one of a downlink or an uplink.

11. A network entity for wireless communication, comprising:
a memory; and
one or more processors, coupled to the memory, configured to:
transmit, to a user equipment (UE), an indication associated with a quantity of active hybrid automatic repeat request (HARQ) processes, wherein the quantity of active HARQ processes is dynamically changeable based at least in part on an operating band and an associated subcarrier spacing, wherein the quantity of active HARQ processes is associated with consecutive HARQ process identifiers or non-consecutive HARQ process identifiers based at least in part on a bitmap; and
receive, from the UE, HARQ feedback based at least in part on the indication associated with the quantity of active HARQ processes.

12. The network entity of claim 11, wherein the indication indicates a subset of HARQ processes to be active from a set of semi-statically configured HARQ processes.

13. The network entity of claim 11, wherein the indication is a dynamic parameter that indicates the quantity of active HARQ processes.

14. A user equipment (UE) for wireless communication, comprising:
a memory; and
one or more processors, coupled to the memory, configured to:
transmit, to a network entity, a first indication of a preferred buffer size;
receive, from the network entity and based at least in part on the first indication, a second indication associated with limited buffer rate matching (LBRM) per active hybrid automatic repeat request (HARQ) process, wherein the second indication associated with the LBRM indicates different maximum buffer sizes per active HARQ process; and
perform a rate matching for incremental redundancy HARQ based at least in part on the second indication.

15. The UE of claim 14, wherein a total buffer size is equally divided by a quantity of active HARQ processes and assigned to each of the quantity of active HARQ processes.

16. The UE of claim 14, wherein the second indication indicates a maximum buffer size that is specific to a single active HARQ process.

17. The UE of claim 14, wherein the one or more processors, to receive the second indication, are configured to receive the indication via a semi-static assignment via radio resource control signaling or a media access control control element.

18. The UE of claim 14, wherein the first indication is transmitted via uplink control information, a media access control control element, or UE assistance information feedback.

19. The UE of claim 14, wherein the one or more processors, to receive the second indication, are configured to receive the indication via a dynamic assignment.

20. The UE of claim 14, wherein scheduling downlink control information (DCI) includes a field indicating a maximum buffer size for scheduled data, and wherein a listing of candidate maximum buffer sizes is configured and an index of the listing is indicated in the scheduling DCI.

21. The UE of claim 14, wherein an aggregation of maximum buffer sizes for a plurality of active HARQ processes does not exceed a UE capability.

22. The UE of claim 14, wherein the second indication indicates a zero buffer size for a specific active HARQ process, and wherein no HARQ combining is permitted for a HARQ identifier associated with the specific active HARQ process.

23. The UE of claim 14, wherein a circular buffer size at the UE for HARQ combining corresponds to a circular buffer size at the network entity for rate matching.

24. The UE of claim 14, wherein rate matching, a starting point of each redundancy version associated with a circular buffer, and HARQ combining are aligned between the UE and the network entity.

25. The UE of claim 14, wherein:
the one or more processors are further configured to transmit, to the network entity, capability signaling that indicates one or more of: a total buffer size limit, maximum or minimum values for a maximum buffer size per active HARQ process, or a maximum or minimum quantity of active HARQ processes; and
the one or more processors, to receive the second indication, are configured to receive the indication based at least in part on the capability signaling.

26. A network entity for wireless communication, comprising:
a memory; and
one or more processors, coupled to the memory, configured to:
receive, from a user equipment (UE), a first indication of a preferred buffer size;
transmit, to the UE, a second indication associated with limited buffer rate matching (LBRM) per active hybrid automatic repeat request (HARQ) process, wherein the second indication associated with the LBRM indicates different maximum buffer sizes per active HARQ process; and
perform a rate matching based at least in part on the indication associated with the LBRM per active HARQ process.

27. The network entity of claim 26, wherein a total buffer size is equally divided by a quantity of active HARQ processes and assigned to each of the quantity of active HARQ processes.

28. The network entity of claim 26, wherein the second indication indicates a maximum buffer size that is specific to a single active HARQ process.

29. The network entity of claim 26, wherein the first indication is transmitted via uplink control information, a media access control control element, or UE assistance information feedback.

30. The network entity of claim 26, wherein rate matching, a starting point of each redundancy version associated with a circular buffer, and HARQ combining are aligned between the UE and the network entity.

* * * * *